United States Patent [19]

Brechling et al.

[11] 3,896,482

[45] July 22, 1975

[54] DYNAMIC MOSFET LAYOUT TECHNIQUE

[75] Inventors: George E. Brechling, Gaithersburg; John J. Montren, Derwood, both of Md.

[73] Assignee: International Business Machines Corporation, Armonk, N.Y.

[22] Filed: June 27, 1973

[21] Appl. No.: 374,173

Related U.S. Application Data

[62] Division of Ser. No. 267,869, June 30, 1972, abandoned.

[52] U.S. Cl. .................. 357/23; 307/213; 307/243; 307/304

[51] Int. Cl. ......................... H01l 11/00; H01l 15/00

[58] Field of Search ........ 317/235 G; 307/304, 243, 307/244, 213

[56] References Cited

UNITED STATES PATENTS

| | | | |
|---|---|---|---|
| 3,378,688 | 4/1968 | Kabell | 317/235 |
| 3,533,089 | 10/1970 | Wahlstrom | 317/235 |
| 3,582,683 | 6/1971 | Podraza | 307/243 |

OTHER PUBLICATIONS

IBM Tech. Discl. Bul., "FET Gating Circuits" by Cole et al., Vol. 13, No. 6, November 1970, page 1727.

IBM Tech. Discl. Bul., "Master Slice Unit for MOS-FET Integrated Circuit Fabrication" by Ho et al., Vol. 12, NO. 8, January 1970, page 1159–60.

IBM Tech. Discl. Bul., "One-in-Ten FET Circuitry" by Laundauer, Vol. 8, No. 9, February 1966, pages 1303–4.

*Primary Examiner*—Andrew J. James
*Attorney, Agent, or Firm*—John E. Hoel

[57] ABSTRACT

A standardized two-dimensional layout and method are disclosed for generating topologies for large scale integrated FET logic circuits for embodiment in a semiconductor wafer. The method is based upon the following steps. Dividing a photolithographic diffusion mask into an array of alternating parallel stripes denoting allowed and forbidden zones for diffusion. Defining the source and drain of an FET device by a juxtaposed pair of diffusion bar images on the mask, occupying two nearest neighbor allowed zones for diffusion, respectively. Referencing the location of the pair of diffusion bar images to the location on a second level, of the metallized gate for the device. Selecting the location of the metallized gate on the second level in accordance with gate wiring and overlap rules. Constraining the location of the metallized gate on the second level so that the referenced pair of diffusion bar images will fall within allowed zones for diffusion on the mask. A standardized layout of FET devices is thereby formed with 2° of freedom. A novel alternating series array of diffusion segments may be produced by the method, forming an AND logical function having a minimum transverse dimension when laid out.

1 Claim, 44 Drawing Figures

$\overline{V_0} = B \cdot C(A+D)+G(E+H)(F+I)$

DYNAMIC MOSFET LAYOUT TECHNIQUE

This is a division, of application Ser. No. 267,869 filed June 30, 1972, now abandoned.

FIELD OF THE INVENTION

The invention disclosed herein relates to integrated circuits and more particularly to field effect semiconductor circuits, herein referred to as FET's.

DESCRIPTION OF THE PRIOR ART

Standardized FET integrated circuit layouts are heretofore being based upon the master-slice method. In the master-slice method, a standardized array of diffusion shapes is deposited on the wafer with the intention of imparting all circuit personality by means of variations in the location and interconnection of the overlying metallized gates and thin oxide. Master-slice has the same basic diffusion pattern. A December, 1967 article by A. Weinberger in the IEEE Journal of Solid State Circuits, Vol. SC2, No. 4, Pages 182–190, illustrates the master-slice method. An FET integrated circuit arrangement is disclosed consisting of a spaced parallel diffusion pattern to be embodied in a semi-conducting wafer, ,with interconnection metallization to be embodied on a higher level. The layout method comprises the steps shown in FIGS. 1 and 2. In FIG. 1, the diffusion rows 2, 4, 6 and 8 are repeated across the chip to form the fixed, master slice diffusion pattern. Wafers with this fixed diffusion pattern are stock piled for future circuit personalization by means of locating the metallized gates 10 in FIG. 2. The layout permits but a single degree of freedom in circuit personalization through the placement of metallized gates 10 over the fixed diffusion 2, 4, 6 and 8 forming the FET devices. Variations in the personalized interconnection of the diffusion rows can only be accomplished by varying the position of the metallized gates along the respective diffusion row axes and the interconnection of those metallized gates by means of via holes 12, with the fixed diffusions 2, 4, 6 and 8. This prior art standardized one dimensional layout and method works well for moderate density integrated circuit devices with a low order of logical complexity, however, its inherent lack of flexability in the location and interconnection of device nets precludes its applicability to high density integrated circuit applications embodying complex logical functions.

OBJECT OF THE INVENTION

It is an object of the invention to systematically arrange an FET integrated circuit with 2° of freedom.

Another object of the invention is to systematically arrange an FET integrated circuit in a more flexable manner than known in the prior art.

A further object of the invention is to systematically arrange an FET integrated circuit so as to attain a higher logic powr per unit area for complex logical functions than has been achieved in the prior art.

Still another object of the invention is to arrange an FET integrated circuit into fewer diffusion rows per elementary logical function than has been required in the prior art.

SUMMARY OF THE INVENTION

Complex logical functions may be systematically embodied with 2° of freedom, in large scale integrated FET circuitry by means of the standardized two dimensional layout and method invention. The diffusion pattern for a circuit is laid out by means of arranging bar shaped diffusions in a two dimensional array which is quantized to permit the standardization necessary for computer implementation. The bar shaped diffusions when embodied in the semiconductor wafer, will form FET sources, drains and electrical interconnections. A photolithographic diffusion mask is divided into a spaced parallel pattern of allowed and forbidden stripes or zones which alternate across the surface of the mask. Diffusion bars may be defined only in the allowed zones. When embodied in the semiconductor wafer, juxtaposed diffusion bars in neighboring allowed zones will form the source and drain respectively of an FET device. The method of the invention is executed on a working medium such as a cathode ray tube display in a man-machine interactive system. The diffusion patterns to be laid out will appear as bar shaped diffusion images in the working medium, whose location will be adjusted by the layout designer in accordance with the method of the invention. Spaced parallel elongated rectangular areas, hereinafter referred to as virtual diffusion cells, are defined on the working medium and represent the spacially quantized stripes where the bar shaped diffusions are allowed. Each FET device to be embodied is represented on the working medium by the image of the device's metallized gate and gate lead and by the image of the device's diffused, bar shaped source and drain. The location of the source and drain images in the working medium are referenced to the location of the gate image and will move in unison with the gate image when its position is adjusted. The location of the FET device is adjusted by the layout designer so that the image of the metallized gate will be wirable and so that the image of the metallized gate does not overlap other structures. The method imposes a predefined positional relationship between any gate image and the virtual diffusion cell array such that when the gate image is positioned by the layout designer, the source and drain diffusion bar images respectively fall within the allowed regions of neighboring virtual diffusion cells. Interconnection diffusion images are also constrained by the method to lie within the allowed region defined by virtual diffusion cells. The method is based upon the following steps. Dividing a photolithographic diffusion mask into an array of alternating parallel stripes denoting allowed and forbidden zones for diffusion. Defining the source and drain of an FET device by a justaposed pair of diffusion bar images on the mask, occupying two nearest neighbor allowed zones for diffusion respectively. Referencing the location of the pair of diffusion bar images to the location on a second level, of the metallized gate for the device. Selecting the location of the metallized gate on the second level in accordance with gate wiring and overlap rules. Constraining the location of the metallized gate on the second level so that the referenced pair of diffusion bar images will fall within allowed zones for diffusion on the mask. A standardized layout of FET devices is thereby formed with two degrees of freedom. The computer program implementing the method of the invention is initialized from input data sets defining the virtual diffusion cell array and gate wiring overlap rules. The program then operates on a data set entered on a visual display by the layout designer, defining a nominal origin of coordinates for each FET device, and automatically generates the desired pattern for the source and drain diffusion bars, applying the gate wiring and overlap rules.

The standardization for the resulting layout arises from the requirement that the resulting diffused structures are composed of the simple bar shaped elements, that the location of these elements is spacially quantized into allowed zones which are separated by forbidden zones, and that position of the source and drain diffusion bars in each device is referenced with respect to the position of the metallized gate for that device. The 2° of freedom for locating the resulting devices arises from the capability of the method to permit the arrangement of the diffusion bars in two dimensions. The execution of the systematic method yields a high density LSI layout for complex logical functions, having a higher logic power per unit area than has been achieved in the prior art. The method may be employed to arrange elementary logical functions into a layout having as few as two diffusion rows.

DESCRIPTION OF THE DRAWINGS

The foregoing and other objects, features and advantages of the invention will be apparent from the following more particular description of the preferred embodiments of the invention, as illustrated in the accompanying drawings.

DISCUSSION OF THE PREFERRED EMBODIMENT

The purpose of an integrated circuit mask layout method is to assist the designer in getting from a logic diagram or circuit schematic to a photolithographic mask art work ready for reduction. The initial design of new integrated circuits can be so slow and expensive that many potential users avoid them. New integrated circuits are normally designed only when they will be used in sufficient volume to amortize the high design cost. Reducing the cost and time required for a development of new integrated circuits could make their use more wide spread. One way of achieving a substantial speedup in design time is to use a systematic method for laying out the circuit, amenable to computer assisted design techniques. However, the standardization introduced into the layout method to render it amenable to computer assisted design, must not impose substantial limitations on the flexibility of the layout or on the freedom of the designer to choose the shape and location of device circuits to be embodied.

THE METHOD OF THE INVENTION

Figure 1:
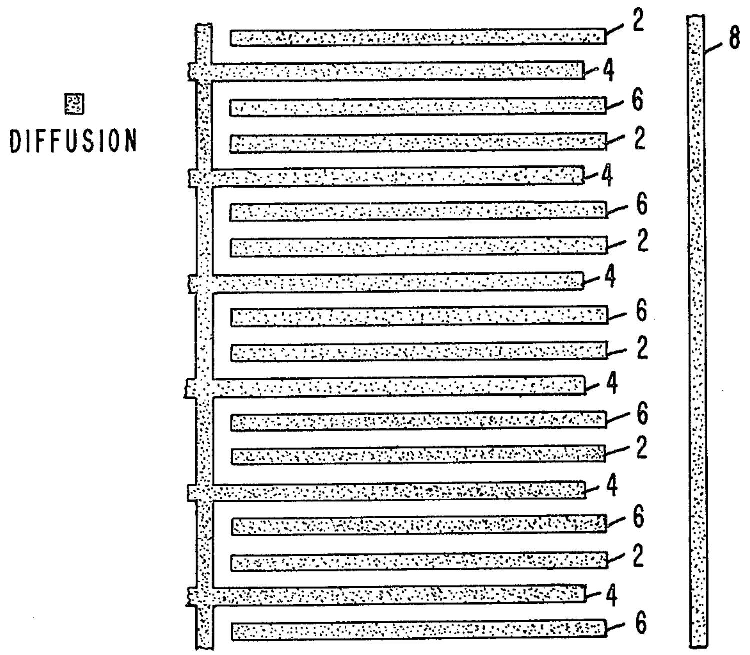
FIG. 1 PRIOR ART
FIG. 1 illustrates a master-slice diffusion pattern for a prior art standarized one dimensional FET integrated circuit layout method.
Figure 2:
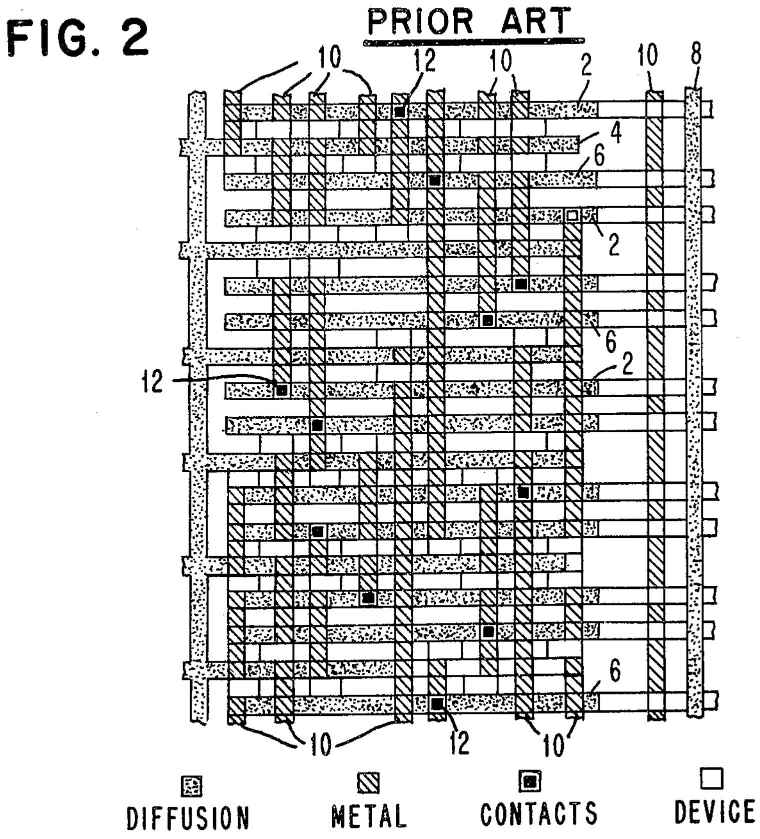
FIG. 2 PRIOR ART
FIG. 2 illustrates the personalization step employing metallized personality patterns in the prior art standardized one dimensional FET integrated circuit layout method of FIG. 1.
Figure 3:
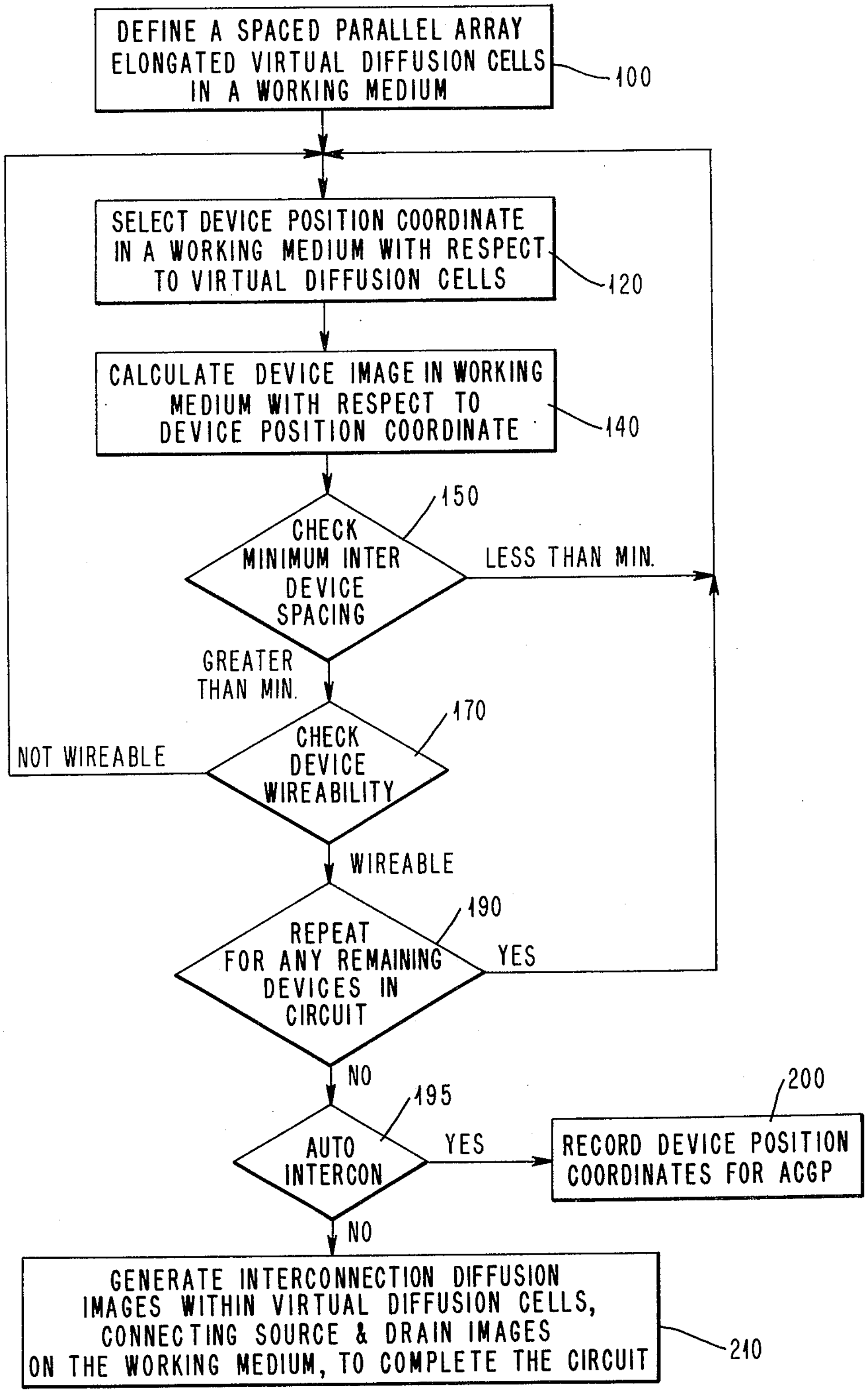
FIG. 3 illustrates the flow diagram for the standardized two dimensional LSI-FET layout method invention.
Figure 4:
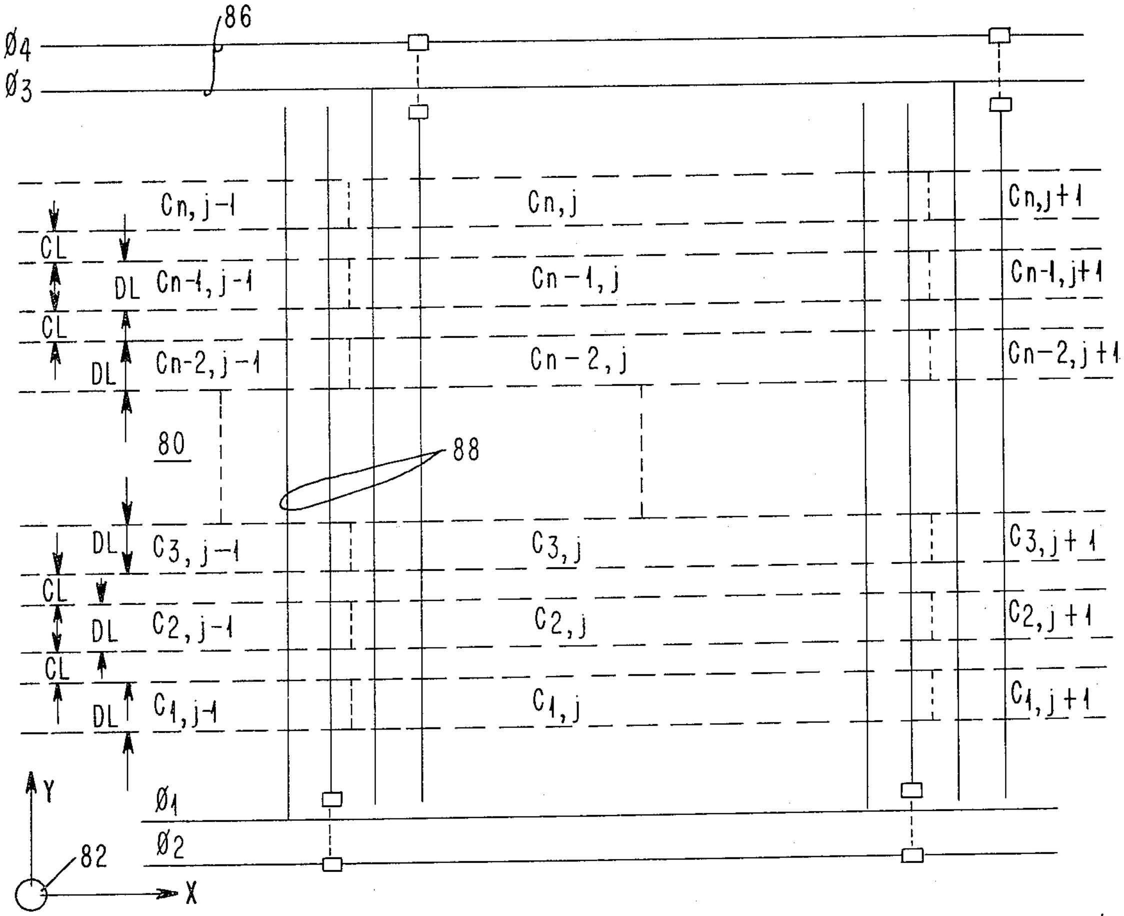
FIG. 4 illustrates the image in the working medium of virtual diffusion cells and power lines corresponding to the active area of a chip upon which is to be embodied the standardized two dimensional layout disclosed.

The standardized two dimensional LSI-FET layout method disclosed in the flow chart of FIG. 3 provides a level of standardization in the layout process necessary for computer assisted implementation and yet retains a high degree of flexibility in the resulting layout and a freedom for the designer to alter the shape and location of the device circuit to be embodied. The method commences with the first step 100 wherein a spaced parallel array of elongated virtual diffusion cells are defined in a working medium. FIG. 4 illustrates the image in the working medium of the elongated virtual diffusion cells $C_{ij}$. The working medium can be a sheet of paper, for instance, in the manual execution of method of FIG. 3, or it can be the data field for a cathode ray tube display console in an on line, computer assisted design system. For manual execution, the virtual diffusion cells would be areas bounded by reference lines defining the permissible location for diffusion images in the photolithographic master to be generated. In a computer assisted design system the virtual diffusion cells are areas bounded by horizontal vector strokes across the face of the CRT. The second step in the standardized two dimensional LSI FET layout method is step 120 in FIG. 3, selecting a device position coordinate in the working medium with respect to the virtual diffusion cells. A device position coordinate is the origin or reference coordinate for a particular device to be embodied. The dimensional characteristics of the device are referenced with respect to the device position coordinate so that if the designer wishes to move the device to a different location in the working medium he merely moves the device position coordinate and the image of all component structures in the device move in unison, herewith. The device position coordinate must always be located with respect to a virtual diffusion cell, in a predefined positional relationship. For example, the designer may arbitrarily choose a particular virtual diffusion cell with which the device position coordinate is to be associated, but in adjusting the location of the device position coordinate, it must always fall upon a prespecified reference line, for example, the lower bounding reference line defining a virtual diffusion cell may be chosen in this case. This is but one example of the predefined positional relationship between the device position coordinate and the virtual diffusion cell array. The predefined positional relationship between the device position coordinate and the virtual diffusion cell contributes to the standardization necessary to make the layout method amenable to computer assisted design techniques. The third step in the standardized two dimensional LSI-FET layout method of FIG. 3 is step 140, calculating the device image in the working medium with respect to the device position coordinate. As will be shown herein, the dimensional characterisitics of an FET device may be defined with the device position coordinate thereof. The execution of step 140 generates the coordinates for the image of the gate, the gate lead, the thin oxide region, the source, and the drain which comprises the component images necessary to define the photolithographic replica of a complete FET device. All or a representative portion of the device image so calculated, may be displayed in the working medium, located with respect to the device position coordinate. The fourth step in the standardized two dimensional LSI-FET layout method shown in FIG. 3 is step 150, checking the minimum interdevice spacing. The executing step 150, the designer in the manual mode, or the computer in the computer assisted design mode, inquires as to whether the distance between the image of the device being defined in the working medium is less than some predefined minimum distance from the images of predefined devices in the working medium. If such interdevice distance is less than that predefined minimum, the method returns to step 120 where the designer selects a new location for the device position coordinate in the working medium with respect to the virtual diffusion cells, a new device image is calculated in the working medium with respect to the new location for the device position coordinate, and the interdevice spacing is again checked to determine if it is greater than that predefined minimum spacing. If the interdevice spacing is greater than the predefined minimum spacing, the method continues on to step 170 of FIG. 3. The fifth step in the standardized two dimensional LSI-FET layout method of FIG. 3 is step 170, checking the device wirablility. In executing step 170, the designer in the manual mode, or the computer in the computer assisted design mode inquires as to whether the image of the gate lead which was calculated in step 140, overlaps or violates the minimum spacing of the image of any predefined device in the working medium. If such an overlap or spacing violation is determined the device is considered not wirable in the position presently occupied and the method returns to step 120 where a new location is selected for the device position coordinate in the working medium with respect to the virtual diffusion cells, a new device image is calculated in the working medium with respect to the new location for the device position coordinate, a check is made as to whether the interdevice spacing is greater than a predefined mimimum, and the device is then once again checked for its wirability in the newly selected position. If in step 170, it is determined that the image of the gate lead does not overlap the image of any other predefined device, the device is wirable in its present location and the method proceeds to step 190. The sixth step in the standardized two dimensional LSI-FET layout method of FIG. 3 is step 190, which repeats the steps 120, 140, 150 and 170 for all remaining devices in the FET circuit net to be embodied. If all the remaining devices in the circuit to be embodied have been operated upon by the method, the method proceeds to step 195. The seventh step of the standardized two dimensional LSI-FET layout method is step 195 of FIG. 3, inquiring as to whether the device position coordinates which have been generated for the devices laid out by the method, are to be immediately recorded for future use by the Automated Circuit Generation Program which is disclosed in the G. E. Brechling, et al. patent application, Ser. No. 213,695, assigned to the instant assignee or whether step 210 of the method of FIG. 3 is to be executed manually, interconnecting the source and drain images on the working medium to complete the layout of the large scale integrated FET-logic circuit. The eighth step of the standardized two dimensional LSI-FET layout method is step 200 of FIG. 3, recording the device position coordinates for the automatic circuit generation program. The ninth step of the standardized two dimensional LSI-FET layout method is step 210 in FIG. 3, interconnecting the source and drain images on the working medium by means of generating interconnection diffusion images within the virtual diffusion cells, connecting source and drain images defined in the working medium, to complete the circuit to be laid out.

Three topological data sets can be generated from a single application the method of the invention, corresponding to the diffusion patterns, the thin oxide window pattern, and the metallization pattern. Each data set can be employed to generate a finished photolithographic mask for each of the three respective levels requiring personalization in a MOSFET circuit, the semiconductor, the insulating layer, and the metallization layer.

VIRTUAL DIFFUSION CELLS

FIG. 4 is an image in the working medium of the virtual diffusion cells and power lines corresponding to the active area of a chip upon which is to be embodied the standardized two dimensional layout disclosed. The replica of the active area 80 is oriented by defining an origin of coordinates 82, with the *x* axis as horizontal and directed from left to right and the *y* axis as vertical and directed from bottom to top. The replica of the active area of the chip surface is divided into a plurality of parallel virtual diffusion cells oriented in the horizontal *x* direction with respect to the coordinates *x* and *y* at the origin 82, and in spaced relationship with one another in the *y* direction. The virtual diffusion cells are enumerated by the symbol $C_{ij}$ with conventional matrix notation, the first subscript *i* indicating the number of the row in the ascending direction from bottom to top and the second subscript *j* designating the column as defined by the clock or voltage bus, in the ascending *x* direction from left to right. Within each virtual diffusion cell $C_{ij}$ may be located the image of one or more elongated diffusion segments which will eventually be embodied in the semiconductor wafer by means of photolithographic reduction. As embodied in the semiconductor wafer, the elongated diffusion segments in adjacent virtual diffusion cells $C_{ij}$ and $C_{i+1,j}$ are separated by an undiffused channel region on the chip surface corresponding to the replica channel region 84 in the working medium shown in FIG. 4. A virtual diffusion cell $C_{ij}$ is defined as an elongated rectangular geometric reference figure of pre-specified width and length. The cell height in the *y* direction normally is approximately equal to a minimum diffusion line width. Channel regions corresponding to the replica channel region 84 separating the virtual diffusion cells $C_{ij}$ tyically have a height equal to the minimum required diffusion-to-diffusion spacing, so as to enable the definition of the gate region of an IGFET transistor to be embodied in the semiconductor wafer. The virtual diffusion cells $C_{ij}$ define permissible areas which may be utilized to create variable length horizontal diffusions required to construct FET devices, make diffusion interconnections, extend clock lines, or serve as diffused underpasses in the integrated circuit to be embodied in the semiconductor wafer. The preferred pattern for intercircuit connections between autonomous clusters of virtual diffusion cells devoted to discrete logic functions, is in the vertical or *y* direction using metallization on the external surface of the insulating layer 420 in FIG. **12*b* and employing via holes through the insulating layer, to contact the diffusion segments on the chip surface. FIG. 4 also illustrates images of the clock or voltage buses 86 in the working medium which correspond to clock or voltage buses to be embodied in the integrated circuit. Clock buses enable the distribution of the clock phase waveform in dynamic FET logic applications. Voltage buses enable the distribution of power in static FET logic applications. Clock or voltage line images 88 extend from the clock or voltage bus image 86 in the vertical or $y$ direction, which correspond to lines for distributing the clock phase waveform or power to logic functions to be embodied. The clock or voltage buses and clock or voltage lines to be embodied in the integrated circuit will be metallizations which are deposited upon the external surface of the insulating layer 420** on the semiconductor wafer.

Computer Program Implementation of the Method of the Invention

Figure 5A:
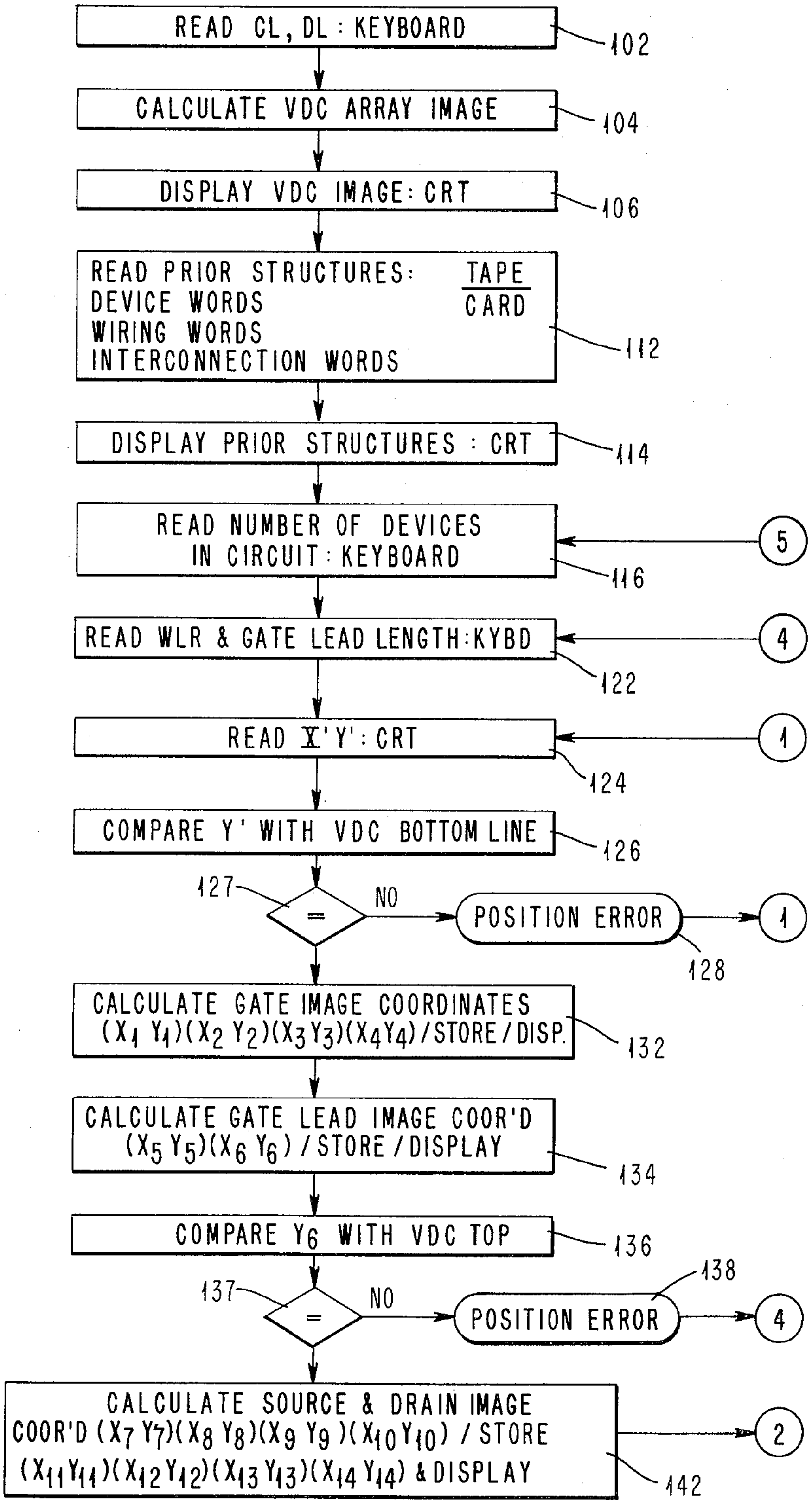
FIGS. 5*a*-5*c* illustrates a flow chart for a computer program to implement the standardized two dimensional LSI-FET layout method of FIG. 3.
Figure 5B:
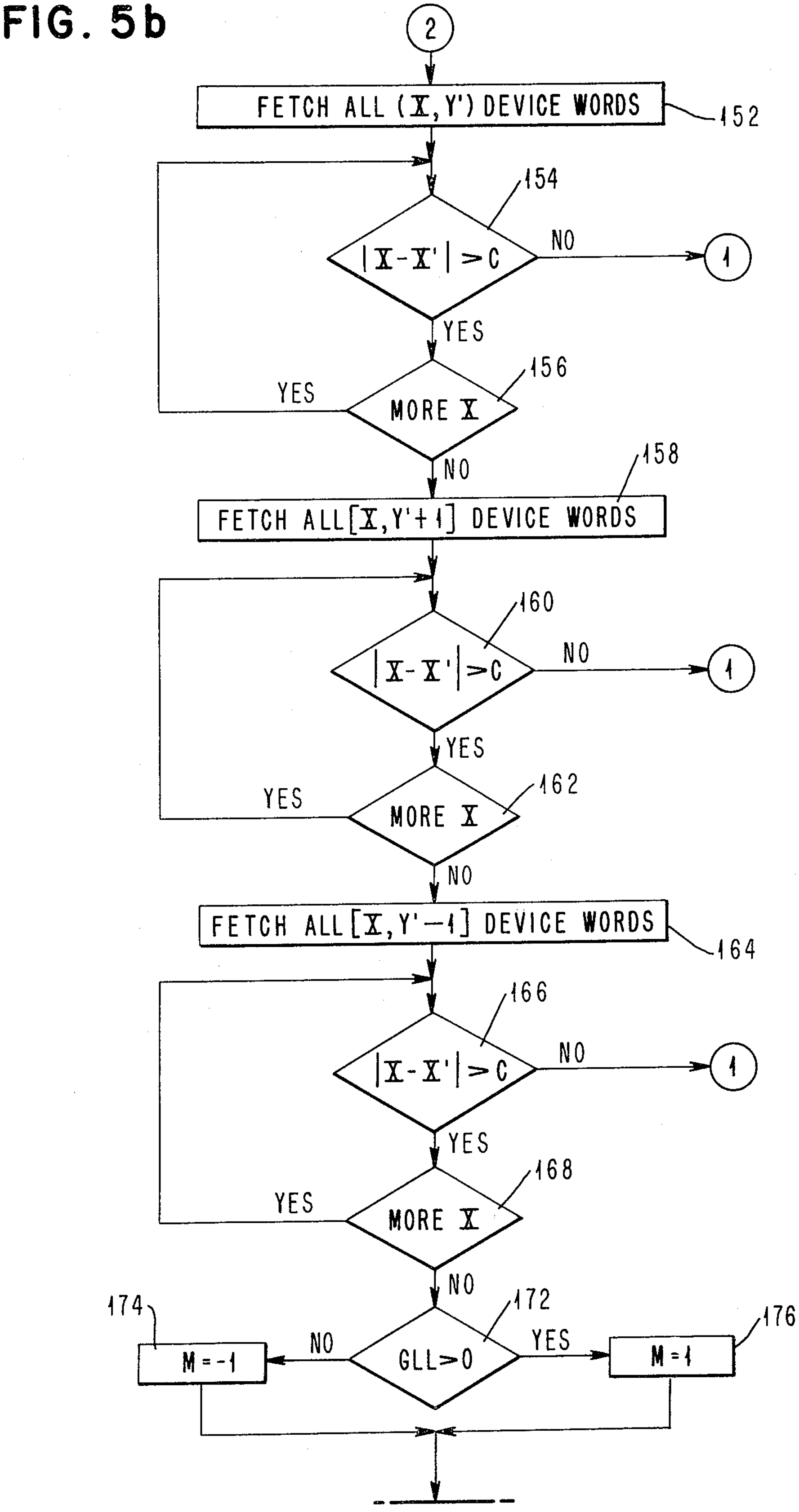
Figure 5C:
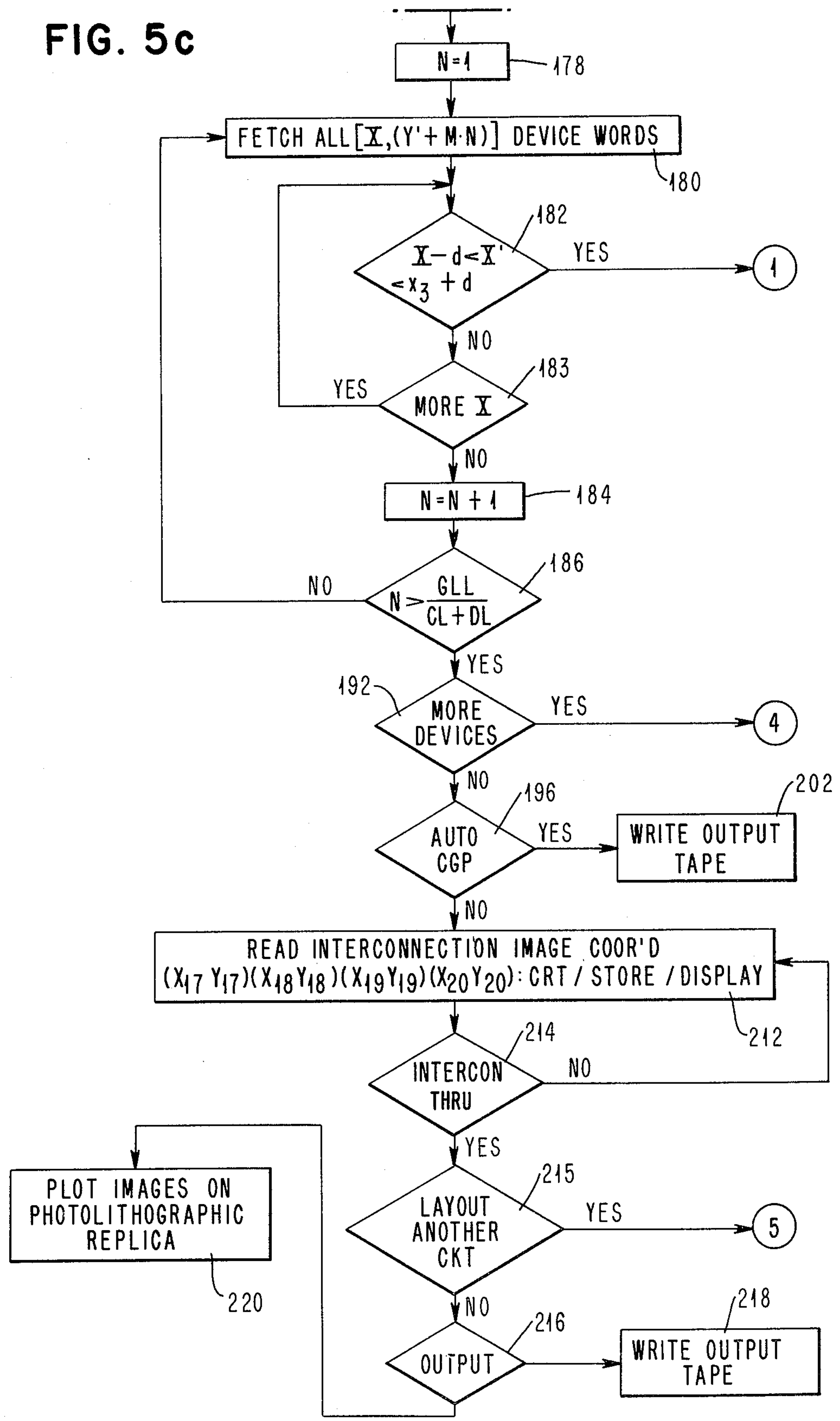

The flow chart for a computer program to implement the standardized two dimensional LSI-FET layout method of FIG. 3, is shown in FIG. 5. The program is to be executed by the man-machine interactive system for implementing the standardized two dimensional layout method, shown in FIG. 9.

Figure 9:
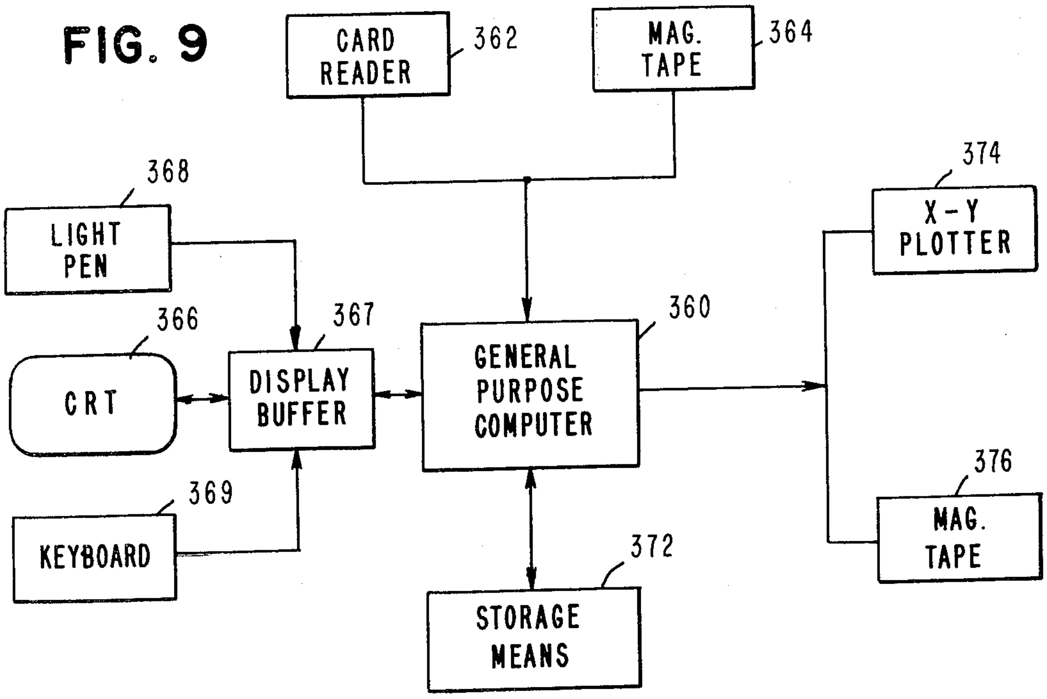
FIG. 9 symbolically illustrates the man-machine interactive system for implementing the standardized two dimensional LSI-FET layout method.

The system of FIG. 9 comprises a general purpose computer 360, which may be an IBM System 360 mod 50. The data input devices include a unit record card reader 362 and an input tape 364. The peripheral equipment for the man-machine interface comprises a CRT display 366, which can be an IBM 2250 display consol mod 3, a display buffer 367, light pen 368, and key board 369. Associated with the general purpose computer 360 is the bulk storage means 372. The data output peripheral equipment for the system comprises an $X–Y$ plotter 374 with vector stroke capability and the output tape 376. The IBM 2250 mode 3 display consol has certain features useful to the instant application including a programmed function keyboard wherein the depression of a predefined key starts a subroutine associated with a particular program. In addition, there is a light pen tacking capability which enables the user to locate the light pen on a blank part of the CRT and to track the pen as it is displaced across the CRT, its instantaneous location being updated in the display buffer 367. There is also a vector stroke capability, whereby with the definition of the end coordinates of a straight line, the image of that line will be stored and displayed.

Step 100 of the standardized two dimensional LSI-FET layout method, defining a spaced parallel array of elongated virtual diffusion cells in a working medium is implemented by means of steps 102, 104 and 106 in the computer program of FIG. 5. Referring to FIG. 4, virtual diffusion cell $C_{1,j}$ is defined by the lower and upper reference lines 90 and 92, respectively, which are separated by distance DL called the diffusion length. The replica in the working medium of the channel region separating virtual diffusion cells $C_{1,j}$ and $C_{2,j}$ has lower and upper bounds of reference lines 92 and 94, respectively, which are separated by the distance CL which is termed the channel length. Step 102 of the computer program of FIG. 5, reads from the keyboard 369 of the system of FIG. 9, the numerical values for the channel length CL and the diffusion length DL. Step 104 of the computer program of FIG. 5 then calculates the virtual diffusion cell array image by merely defining a first reference line 90 in FIG. 4 and adding the numerical value for the diffusion length DL in the $y$ direction to determine the position of the upper bound reference line 92 for the virtual diffusion cell $C_{1,j}$. Step 104 continues by adding the numerical value for the channel length CL in the $y$ direction to determine the position of reference line 94 which is the lower bound for virtual diffusion cell $C_{2,j}$. Step 104 continues by adding the numerical value for the diffusion length DL in the $y$ direction to determine the position of the reference line 96 which is the upper bound for the virtual diffusion cell $C_{2,j}$. Continuing this sequence of operations N times yields an N by M array of virtual diffusion cells, where M equals the number of columns. Step 106 of the computer program of FIG. 5 then displays the virtual diffusion cell array image as illustrated in FIG. 4, on the CRT 366 of the system of FIG. 6.

Figure 6A:
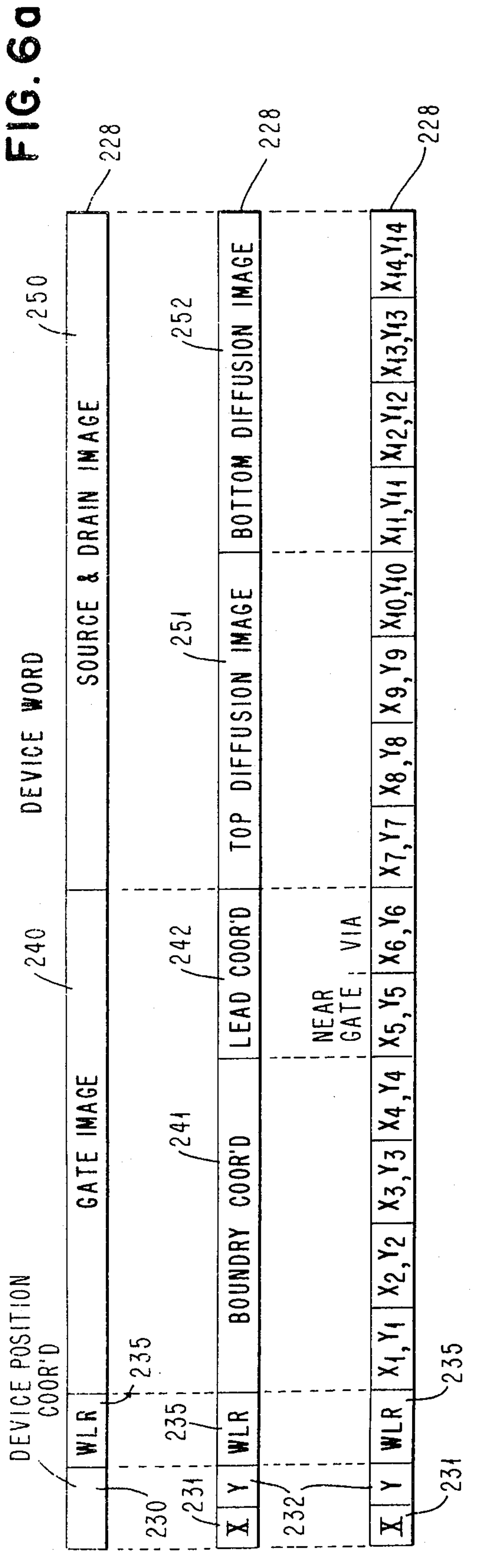
FIG. 6*a* symbolizes the device word which stores the device position coordinate, the width to length ratio, and the image coordinates the the device as depicted in FIG. 6*b*.
Figure 6B:
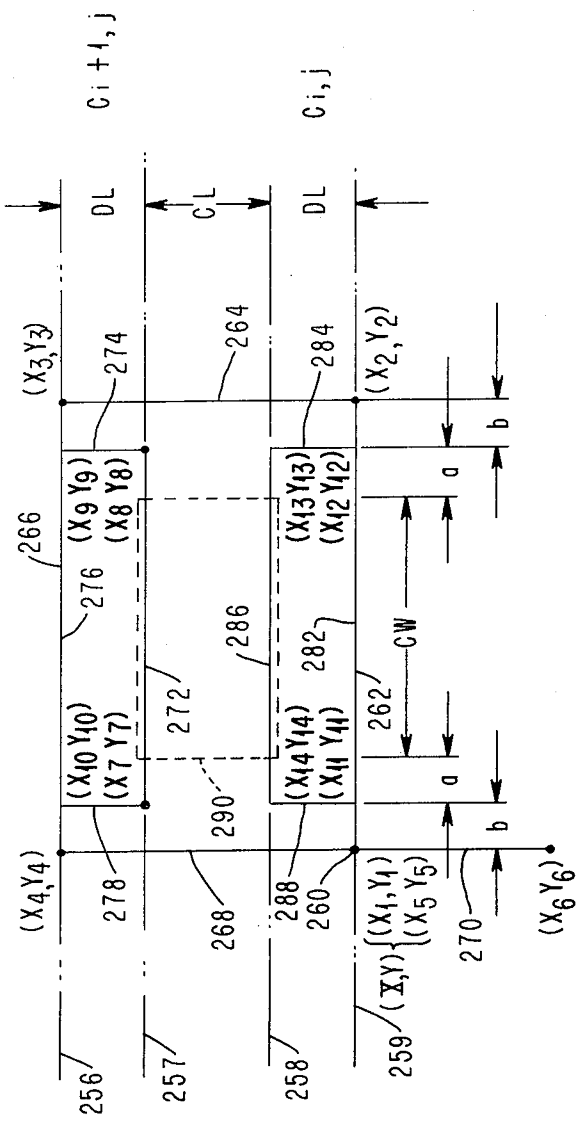
FIG. 6*b* illustrates the device image as it would appear on the working medium and as it is defined by the device word of FIG. 6*a*.

The computer program of FIG. 5 stores the images of the FET devices, diffusion interconnections, and metallized wiring in the bulk storage means in the form of device words, interconnection words and wiring words respectively. FIG. 6a illustrates a device word which stores the device position coordinate (X,Y), the width to length ratio WLR, and the image coordinates, $(x_i, y_i)$ for an FET device as depicted in FIG. 6b. The device word 228 comprises the device position coordinate field 230, the width to length ratio field 235, the gate image field 240, and the source and drain image field 250. Within the device position coordinate field 230 there resides the $x$ coordinate position 231 and the $y$ coordinate position 232 for the device position coordinate. Within the gate image field 240 there resides the gate boundary coordinate field 241 which stores the image coordinates $(x1, y1)$; $(x2, y2)$; $(x3, y3)$; $x4, y4)$, as shown in FIG. 6b. Each gate image coordinate defines one of the four verticies of the rectangular gate image. The gate image coordinate $(x, y)$ is identified with the device position coordinate $(X,Y)$. Also contained in the gate field 240 is the lead coordinate field 242 wherein is stored the vector stroke coordinates $(x5, y5)$; $(x6, y6)$ which define the gate lead. $(x5, y5)$ is identified with the device position coordinate (X,Y) and represents the near gate termination and contact with the gate and $(x6, y6)$ represents the far gate termination and contact with the via hole which communicates with the output diffusion of the interfacing circuit from whence, the gate signal originates. Although the gate lead image is represented by a single line in FIG. 6b and on the working medium, it of course has a finite width sufficient to carry the voltage signal from the output diffusion of the interfacing circuit to the gate itself. The source and drain image field 250 contains the top diffusion image field 251 wherein is stored the top diffusion image coordinates $(x7, y7)$; $(x8, y8)$; $(x9, y9)$; $(x10, y10)$, which defines the four verticies of the rectangular image of the upper diffusion. The source and drain image field 250 also contains the bottom diffusion image field 252 which stores the bottom image coordinates $(x11, y11)$; $(x12, y12)$; $(x13, y13)$; $(x14, y14)$, which define the four verticies of the rectangular image of the lower diffusion. Each of the device image coordinates $(x1, y1)$ to $(x14, y14)$ are referenced to the device position coordinate (X,Y) by means of the equations in Table 1, so that regardless of the position selected for the device position coordinate, the device image coordinates may be immediately determined in the working medium.

TABLE I

Device Image Coordinates $CW = (WLR)\ (CL)$
$x_1 = X;\ y_1 = Y.$
$x_2 = X + CW + 2a + 2b;\ y_2 = Y.$
$x_3 = x_2;\ y_3 = Y + CL + 2DL$
$x_4 = X;\ y_4 = y_3$
$x_5 = X;\ Y_5\ 32\ Y$
$x_6 = X;\ y_6 + Y + GLL$
$x_7 = X + b;\ y_7 = Y + CL + DL$
$x_8 = X + CW + b + 2a;\ y_8 = y_7$
$x_9 = x_8;\ y_9 = y_3$
$x_{10} = x_7;\ y_{10} = y_3$
$x_{11} = x_7;\ y_{11} = Y$
$x_{12} = x_8;\ y_{12} = y$
$x_{13} = x_8;\ y_{13} = Y + DL$
$x_{14} = x_7;\ y_{14} = y_{13}$ It is to be noted that the device position coordinate $(X,Y)$ is constrained to always lie upon a lower bounding reference line 259 of a virtual diffusion diffusion cell $C_{i,j}$. This is the predefined positional relationship between FET device images and the virtual diffusion cell array for the instant example layout. The equations of Table 1 define a lower boundary 282 for the lower diffusion image as having the same certical position as the device position coordinate $(X,Y)$. The equations of Table 1 define the upper boundary 286 for the lower diffusion image as having a vertical position one diffusion length above that for the device position coordinate $(X,Y)$. Thus, so long as the predefined positional relationship between the device image and the virtual diffusion cell array is maintained, the lower diffusion image will always fall within a virtual diffusion cell $C_{i,j}$. The equations of Table 1 define the lower boundary 272 of the upper diffusion image as having a vertical position of a diffusion length plus a channel length above that for the device position coordinate $(X, Y)$. The equations of Table 1 define the upper boundary 276 for the upper diffusion image as having a vertical position of a diffusion length plus a channel length plus another diffusion length above that for the device position coordinate $(X,Y)$. Thus, so long as the predefined positional relationship between the device position coordinate and the virtual diffusion cell array is maintained, the upper diffusion image will always lie within a virtual diffusion cell $C_{i+1,j}$.

Figures 7A, 7B, 7C, 13:
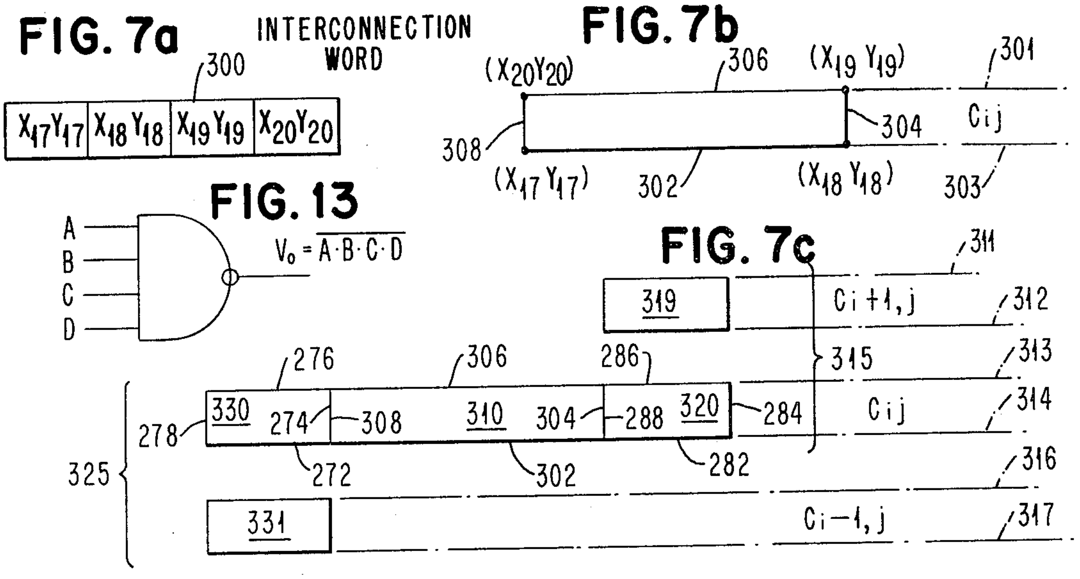
FIG. 7*a* symbolizes the interconnection word which stores the image coordinates for an interconnecting diffusion segment occupying a virtual diffusion cell as shown in FIG. 7*b*.
FIG. 7*b* illustrates an interconnection diffusion segment image as it would appear in the working medium and as is defined by the interconnection word of FIG. 7*a*.
FIG. 7*c* illustrates the interconnection diffusion segment image as it would appear interconnecting to device images in the working medium.
FIG. 13 is a logical diagram for a four high NAND.

The interconnection word shown in FIG. 7*a* stores the image coordinates for an interconnection diffusion segment occupying a virtual diffusion cell as shown in FIG. 7*b*. The interconnection word 300 stores the interconnection diffusion coordinates ($x17$, $y17$); ($x18$, $y18$); ($x19$, $y19$); ($x20$, $y20$); which defines the four verticies of the rectangular interconnection diffusion image shown in FIG. 7*b*. Interconnection diffusion images are defined after the device images have been laid out, and therefore, are easily positioned so as to occupy areas confined within virtual diffusion cells. An interconnection diffusion image as it would appear interconnecting two device images in the working medium as shown in FIG. 7*c*.

Figure 8A:
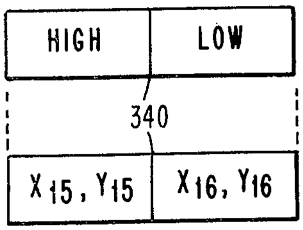
FIG. 8*a* symbolizes the wiring word which stores the image coordinates for a vertical metallized line as depicted in FIG. 8*b*.
Figure 8B:
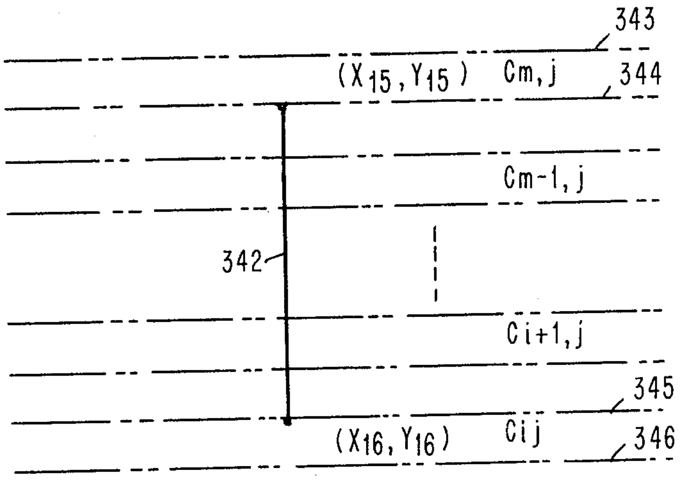
FIG. 8*b* illustrates the wire image as it would appear in the working medium and as is defined by the wiring word of FIG. 8*a*.

Wiring word 340 of FIG. 8*a* stores the terminating coordinates ($x15$, $y15$) and ($x16$, $y16$) for the image of the metallized vertical wiring interconnection shown in FIG. 8*b*. Although the wiring is represented by a single line in FIG. 8*b* and in the working medium, it of course has a finite width sufficient to carry the necessary power or clock signals to the logic circuitry.

Returning to the flow chart of FIG. 5, for a computer program to implement the standardized two dimensional LSI-FET layout method of FIG. 3, an intermediate step is executed to read and display the images of prior structures which have been defined for the integrated circuit to be embodied in the semiconductor wafer. It is these structures which serve as obstacles around which the designer must layout the logic function of immediate interest. Step 112 of FIG. 5 reads device words, wiring words and interconnection words by means of input tape 364 or unit record card reader 362, which data is stored in the bulk storage means 372. The device words, wiring words, and interconnection words are then duplicated in the display buffer 367 for display on the CRT 366 by executing step 114. At this point step 116 of the computer program of FIG. 5 is executed, reading from keyboard 369 the number of FET devices in the circuit to be embodied.

Step 120 of the standardized two dimensional LSI-FET layout method of FIG. 3, selecting the device position coordinate in the working medium with respect to the virtual diffusion cells, is implemented in the computer program of FIG. 5 by means of steps 122, 124, 126, 127 and 128. In step 122 of FIG. 5, the width-to-length ratio of the device to be embodied and the gate lead length are read in from keyboard 369 of FIG. 9. In step 124 of FIG. 5, the designer selects the initial position for the device position coordinate (X,Y) as (X', Y') by locating the light pen 368 in the selected position on CRT face 366. In step 126 of FIG. 5, the value of Y' is compared with the y positions of all of the bottom boundary lines for the virtual diffusion cells generated in step 104. In step 127 if there is no equivalence between the numerical value of Y' and the *y* coordinate of the bottom line of any one of the virtual diffusion cells so generated, there is a vertical positioning error and the program cycles back to step 124, the error is indicated to the designer, and the designer must reposition the device position coordinate generating new values (X'', Y''). If there is in fact an equivalence between the numerical value of Y' and the numerical value of the y coordinate of the bottom line of one of the virtual diffusion cells generated by step of 104 the program continues to step 132.

Step 140 of the standardized two dimensional LSI-FET layout method of FIG. 3, calculating the device image in the working medium with respect to the device position coordinate, is implemented by means of steps 132, 134, 136, 137, 138 and 142 of the computer program of FIG. 5. In step 132, the gate image coordinates are calculated by substituting the value of X' for X and Y' for Y in the equations of Table 1 to generate gate image coordinates ($x1$, $y1$) ; ($x2$, $y2$); ($x3$, $y3$); and ($x4$, $y4$), each of which is entered into its respective location in the gate boundary coordinate field 241 of the device word (X', Y') of FIG. 6*a*, and stored in the bulk storage means 372. The gate image coordinates are duplicated in the display buffer 367 and vector strokes are generated on the CRT connecting the ($x1$, $y1$) with ($x2$, $y2$) coordinates generating the lower gate image boundary 262, connecting ($x2$, $y2$) with ($x3$, $y3$), generating right gate image boundary 264, connecting ($x3$, $y3$) with ($x4$, $y4$) generating upper gate image boundary 266, and connecting ($x4$, $y4$) to ($x1$, $y1$) generating left gate imge boundary 268, thereby displaying the complete gate image for the device referenced with respect to its device position coordinate (X', Y'). Step 134 of the computer program of FIG. 5 calculates the gate lead image coordintes ($x5$, $y5$) and ($x6$, $y6$) by means of substituting the numerical values of X; and Y' for X and Y respectively in the equations of Table 1 and entering the resulting values for $x5$, $y5$, $x6$, and $y6$ in the lead coordinates field 242 of the device word (X', Y') in FIG. 6a. The gate lead image coordinates stored in the bulk storage means 272 and duplicated in the display buffer 367. A vector stroke connecting ($x5$, $y5$) with ($x6$, $y6$) is displayed on the CRT and represents the image of the gate lead as referenced with respect to the device position coordinate (X', Y'). Step 136 is next executed, which compares the numerical value of $y6$ with the numerical value of the $y$ top coordinate for the refernce line for all virtual diffusion cells generated in the working medium. This comparison is performed to determine whether an error in the value of the gate lead length read in step 122 exists. If in fact, the numerical value of $y6$ is not equal to any of the y position values for the top reference line for the virtual diffusion cells generated, a positional error has occurred and the program returns to step 122 for a new value for the gate lead length is read in. If the numerical value of $y6$ equals the $y$ coordinate value for the top reference line for one of the virtual diffusion cells generated in step 104, the program proceeds to step 142. In step 142, the source and drain diffusion image coordinates are calculated. The numerical value of X' and Y' are substituted for X and Y respectively in the equations of Table 1 to generate the numerical values for $x7$, $y7$, $x8$, $x9$, $x10$ and $y10$ and for the upper diffusion image, the image coordinates of which are placed in their respective locations in the top diffusion image field 251 of the device word of FIG. 6a. The numerical value of X' and Y' are substituted for X and Y respectively in the equations in Table 1 to generate the values for $x11$, $y11$, $x12$, $y12$, $x13$, $y13$, $x14$ and $y15$ for the bottom diffusion image, the respective values of which are placed in the bottom diffusion image field 252 of the device word of FIG. 6a. The source and drain image coordinates ($x7$, $y7$) to ($x14$, $y14$) are stored in the bulk storage means and are duplicated in the display buffer 367. Vector strokes corresponding to the boundary lines for the upper diffusion image and the lower diffusion image are generated on the CRT and referenced with respect to the position of the device position coordinate (X', Y'). The device image consisting of the gate image, the gate lead image, the upper diffusion image, and the lower diffusion image are now fully generated, displayed, and referenced with respect to the device position coordinate in the working medium.

Step 150 of the standardized two dimensional LSIFET layout method of FIG. 3, checking the interdevice spacing with respect to a predefined minimum value, is implemented by steps 152, 154, 156, 158, 160, 162, 164, 166 and 168 of the computer program of FIG. 5. Each device word in the bulk storage means 172 may be addressed by the numerical value of the device position coordinates X and Y. In step 152 of FIG. 5, all devices having device position coordinates with a Y value equal to the value Y' of that device being checked, are called from the bulk storage means 372 by the general purpose computer 360. This is done by the FETCH command, fetching all device words having device position coordinates with a Y value equal to Y'. Steps 154 and 156 then perform a loop, determining whether there is sufficient separation distance between the device being checked and all other devices in the same channel. The comparison test is performed in step 154 on the absolute value of the difference between the value of the X component of the device being checked and that of the device being indexed. If the absolute value of such difference is less than a predefined separation distance C, the program returns to step 124 where the designer selects a new device position coordinate in the working medium with respect to the virtual diffusion cells such that the device separation criterion is less likely to be violated. If the comparison indicates that the separation distance is greater than the predefined minimum value C, the device position coordinates for the next device lying along the same channel as the device being checked is compared, until all such devices are compared. The program then transfers to step 158 where a similar operation is performed for all devices occupying the channel immediately above the device being checked. Once again if a preexisting device is found for which the distance between the respective device position coordinates is less than some predefined value C, the program returns to step 124 where the designer selects a new device position coordinate in the working medium with respect to the virtual diffusion cells such that the violation of the interdevice spacing criterion is less likely to occur. After all the devices have been reviewed which lie in the channel above the device being checked the program passes to step 164. A similar operation is once again performed for all devices occupying the channel immediately below the device being checked. Once again, if the minimum spacing criterion is violated the program transfers to step 124 where the designer selects a new device position coordinate in the working medium with respect to the virtual diffusion cells, such that a violation of the minimum spacing criterion is less likely to occur. After all such devices have been reviewed which lie in the channel below the device being checked, the program transfers to step 172.

The predefined separation distance C employed in checking minimum inter-device spacing, need not be constant. Where the width-to-length ratio WLR varies for the devices on a chip, the value of C may be changed for each iteration in the checking loop formed by steps 154 and 156. For example, for the fetch devices so located that their X is less than X' for the device being checked, the separation distance C can equal the WLR of the device fetched times the channel length and plus a constant. For the fetched devices located so that their X is greater than X' for the device being checked, the separation distance C can equal the WLR of the device being checked times the channel length and plus a constant.

Step 170 of the standardized two dimensional LSIFET layout method of FIG. 3, checking device wirability, is implemented by steps 172, 174, 176, 178, 180 and 182, 183, 184 and 186 of the computer program of FIG. 5. Steps 172, 174 and 176 distinguish the algebraic sign of the gate lead length, gate leads projecting above the gate image having a positive gate lead length value and gate leads projecting below the gate having a negative gate lead value. Step 178 then initializes the loop comprising steps 180, 182, 183, 184 and 186. Assume for the purposes of illustration that the gate lead for the device of immediate interest projects below the gate image, causing the value of M to equal −1 in steps 174. In step 180, all device words having device position coordinates with a Y value equal to the quantity Y′ + MN are fetched from the bulk storage means 372 by the general purpose computer 360. For N + 1 and *M* = −1, this corresponds to all those devices whose device position coordinates resides on the virtual diffusion cell $C_{i-1,j}$ immediately below the virtual diffusion cell $C_{i,j}$ upon which is located the device position coordinate of the device of immediate interest. Each such device is indexed through the inner loop comprising the steps of 182 and 183, where a comparison operation is performed assessing whether the *x* location of the gate lead for the device of immediate interest lies within the region occuplied by the prior existing device being indexed. In step 182, if the value of X′ lies between the value of the indexed X minus a predefined quantity D and the value of the indexed *x*3 plus that predefined quantity D, the gate lead for the device of immediate interests overlaps or lies too closely to a predefined structure and thus the device of immediate interest is not wirable where presently located. In such case the program transfers to step 124 where the designer selects a new device position coordinate in the working medium with respect to the virtual diffusion cells, such that the wirability criterion of step 170 is less likely to be violated. If, in step 182, the numerical value of X′ does not lie within the bounds of quantity X − D or quantity *x*3 + D, step 183 continues the inner loop, indexing all other devices whose device position coordinate resides on the virtual diffusion cell $C_{c-1,j}$ lying one cell below the virtual diffusion cell $C_{i,j}$ upon which the device position coordinate of the device of immediate interest lies. After all such devices have been examined by steps 182 and 183, the value of N is incremented by one in step 184 and a comparison is made in step 186 to determine whether the devices to be tested on the next virtual diffusion cell $C_{i-2,j}$, lie outside of the full linear extent of the gate lead for the device of interest. If they do not, the outer loop returns to step 180 where all devices are tested whose device position coordinate lies on the virtual diffusion cell $C_{i-2,j}$ two steps removed from the virtual cell $C_{i,j}$ upon which the device position coordinate of the device of immediate interest lies. After all such devices are tested within the linear extent of the gate lead for the device of immediate interest, the program transfers to step 192.

Step 190 of the standardized two dimensional LSI-FET method of FIG. 3, repeating the steps of selecting, calculating, checking device spacing and checking wireability for all remaining devices in the circuit to be embodied, is implemented by means of step 192 in the computer program of FIG. 5. Step 192 requires as to whether there are more devices to be processed and if so transfers to step 122 where the width-to-length ratio and gate lead length for the next device are entered by means of the keyboard 369 of FIG. 9. After all such devices in the circuit to be embodied have been so processed in the computer program of FIG. 5, program transfers to step 196.

Steps 195 and 200 of the standardized two dimensional LSI-FET layout method of FIG. 3, inquiring as to whether automatic circuit interconnection is to be performed and if so, recording the device position coordinates for the automatic circuit generation program, are implemented by steps 196 and 202 respectively, of the computer program of FIG. 5. In the step 202, the device position coordinates for the array of devices arranged by the standardized two dimensional LSI-FET layout method, are recorded on output tape 376 of FIG. 9. If the Automatic Circuit Generation Program is not desired, the program transfers to step 212.

Step 210 of the standardized two dimensional LSI-FET layout method, generating interconnection diffusion images connecting the source and drain diffusion image on the working medium to complete the circuit, is implemented by steps 212 and 214 of the computer program of FIG. 5. In step 212, a function key is depressed on the keyboard 369 enabling the identification of interconnection diffusion image coordinates by touching the light pen 368 to the verticies of selected, predefined rectangular diffusion images representing preexisting source or drain diffusions or interconnection diffusions. In FIG. 7*c*, a first device 315 is defined by the location of upper and lower diffusion segments 319 and 320 respectively. A second device 325 is defined by the location of its upper and lower diffusion images 330 and 331 respectively. The designer desires to interconnect the lower diffusion segment 330 of the second device 325. By depressing the function key corresponding to an *x*17 and *y*17 are established and entered in the interconnection word 300 of FIG. 7*a*. Similarly, interconnection image coordinate (*x*20, *y*20) is established by identification with upper diffusion image coordinate (*x*9, *y*9) of device 330. Interconnection diffusion coordinates (*x*18, *y*18) is identified with the lower diffusion image coordinate (*x*11, *y*11) for the lower diffusion 320 of device 315, and interconnection diffusion image coordinate (*x*19, *y*19) is identified with lower diffusion image coordinate (*x*14, *y*14) of lower diffusion image 320 of device 315. Interconnection diffusion image coordinates (*x*17, *y*17); (*x*18, *y*18); (*x*19, *y*19); and (*x*20, *y*20) are placed in their respective fields in the interconnection word 300 and stored in bulk storage means 372. The interconnection word is duplicated in display buffer 367. A vector stroke is generated connecting (*x*17, *y*17) and *x*18, *y*18) forming the lower boundary 302 for the interconnection diffusion image 310. A vector stroke is generated interconnecting (*x*20, *y*20) with (*x*19, *y*19) displaying upper boundary 306 for the interconnections diffusion image 310. The execution of step 212 generates an interconnection diffusion image which lies wholly within the virtual diffusion cell $C_{i,j}$, by virtue of referencing its image coordinates with respect to the image coordinates of predefined upper or lower device didfusion images. Step 214 is then executed repeating the step 212 for any other interconnection images which must be generated to complete the circuit to be embodied. The program then passes to step 215.

STep 215 inquires as to whether there is another logical circuit to be laid out by the standardized two dimensional LSI-FET layout method. If there is another such circuit, the program transfers to step 116 where the number of devices in the next circuit is read in from the keyboard 369. If there are no more circuits to be laid out, the program transfers to step 216. Step 216 determines the mode of the output for the image of the completed circuit layout. The device image coordinates may be recorded on the output tape 376 in step 218 for future use, or the images may be plotted on the X-Y plotter 374 for producing photolithographic replicas of the diffusion images and the metallization images for photolithographic reduction into large scale integrated field effect transistor logic circuits.

OVERALL DESIGN CYCLE

Figure 14:
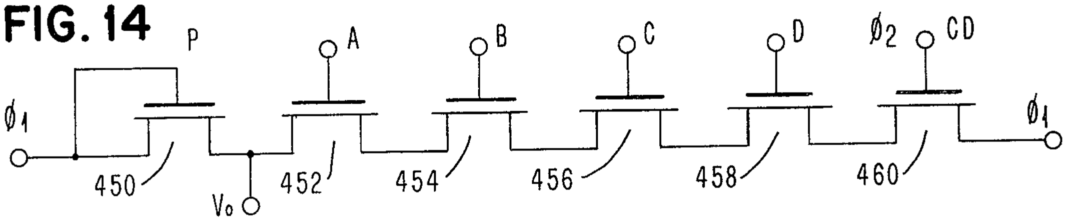
FIG. 14 is an electrical schematic diagram for the four high NAND of FIG. 13, implemented in dynamic FET logic.
Figure 15:
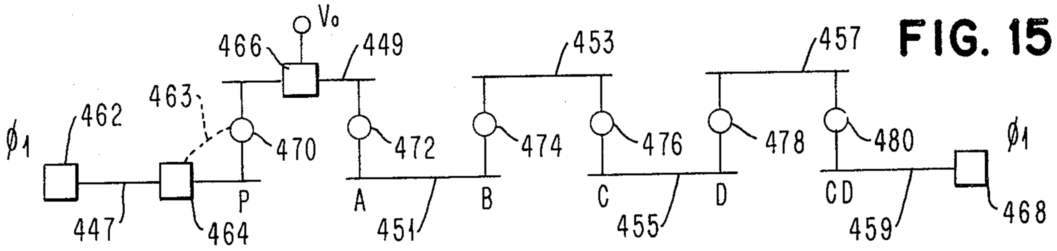
FIG. 15 is a schematic layout diagram of diffusion segments necessary to implement the electrical network of FIG. 14.
Figure 10:
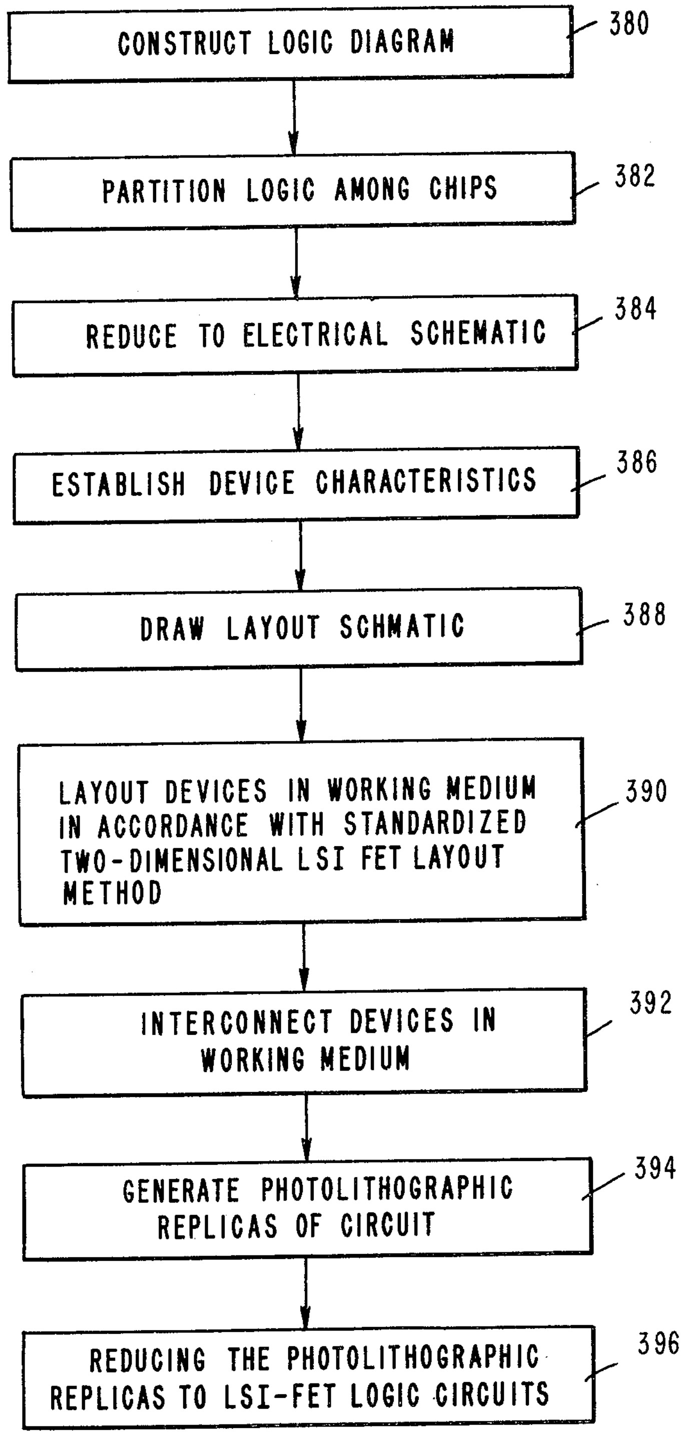
FIG. 10 is a flow chart of the overall design cycle for LSI-FET logic circuits employing the subject standardized two dimensional LSI-FET layout method.
Figure 18A:
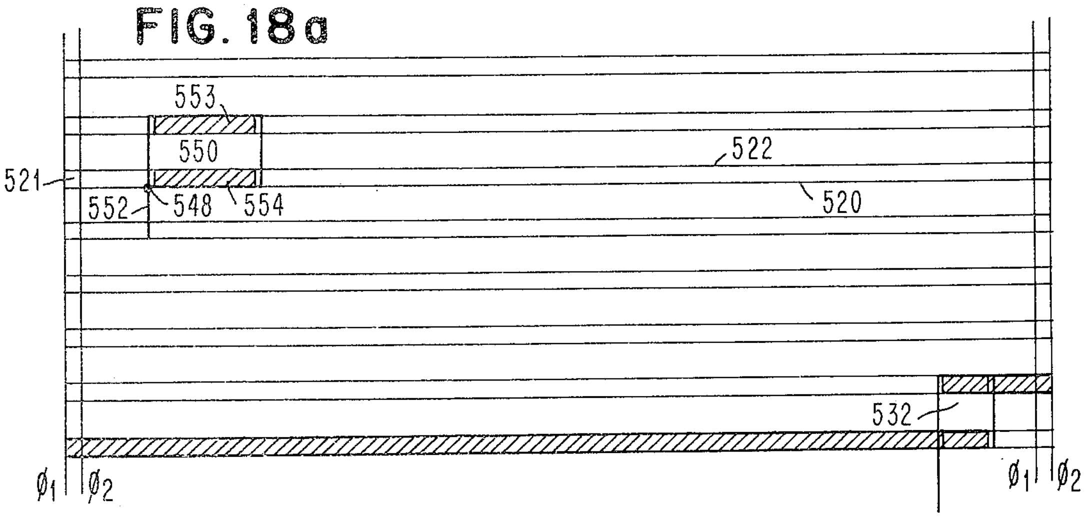
FIG. 18*a* illustrates the result of executing step 120 of the method of FIG. 3, selecting the device position coordinate with respect to the virtual diffusion cell, step 140 of the method of FIG. 3, calculating the gate and gate lead images and calculating the source and drain diffusion images, step 150 of the method of FIG. 3, checking for conformity device spacing requirements, and step 170 of the method of FIG. 3, checking for device wirability for device 550 of example A.
Figure 19A:
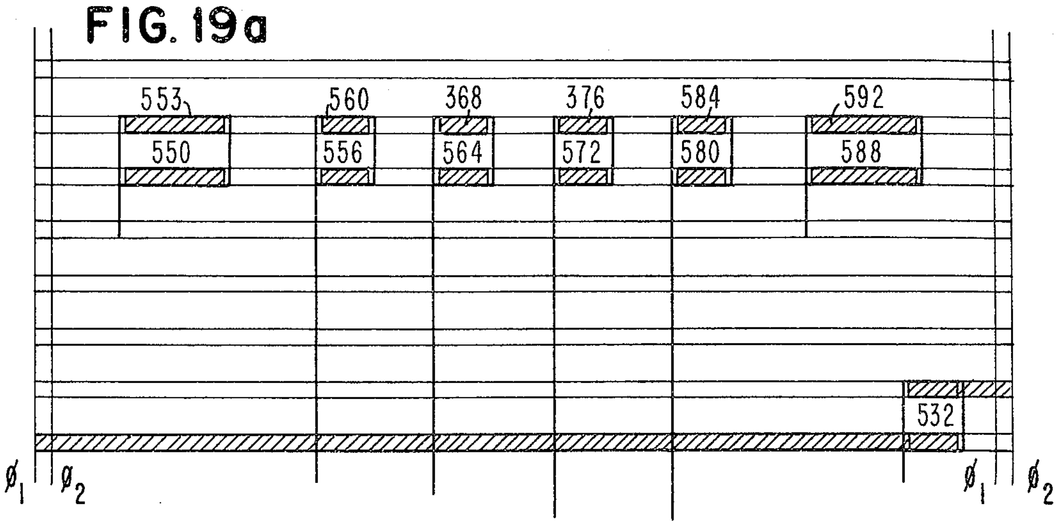
FIG. 19*a* illustrates the result of executing step 190 of the method of FIG. 3, repeating the method for all of other devices in the circuit of example A.
Figure 20A:
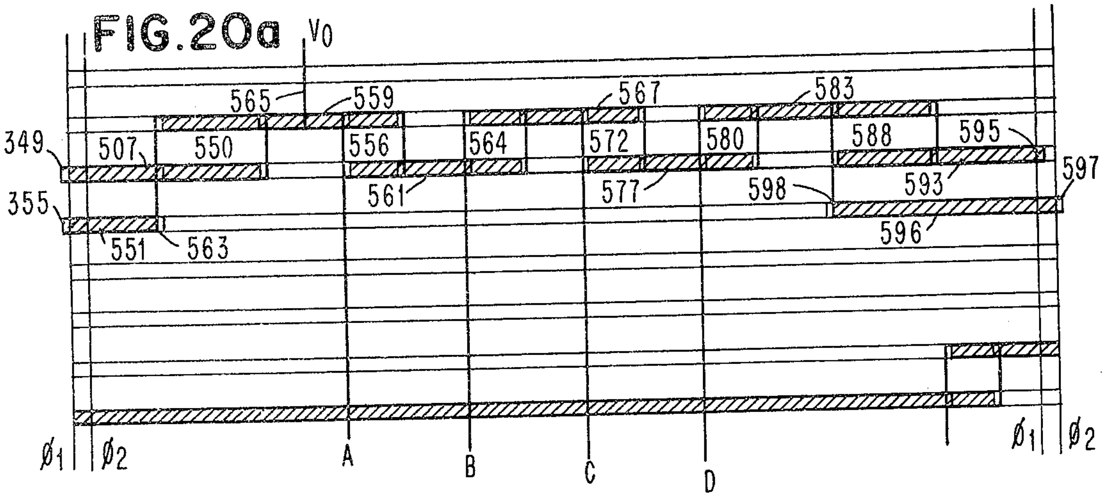
FIG. 20*a* illustrates the result of executing step 210 of the method of FIG. 3, interconnecting the source and drain diffusion images to complete the circuit of example A.

FIG. 10 is an outline flow chart of the overall design cycle for producing an LSI-FET logic circuit employing the subject standardized two dimensional LSI-FET layout method. The design cycle comprises the steps of 380, constructing a logic diagram such as is shown in FIG. 13, step 382, partitioning the logic among a number of LSI chips; step 384 reducing the logic diagram to an electrical schematic such as is shown in FIG. 14; step 386, establishing the device characteristics such as width to length ratio, minimum and maximum net capacitances and resistances, etc.,; step 388, drawing the layout schematic such as is shown in FIG. 15; step 390, laying out the devices in the working medium in accordance with the standardized two dimensional LSI-FET layout method, as is illustrated in FIGS. 18a and 19a; step 392, interconnecting device images by means of interconnection diffusion images in the working medium, as is shown in FIG. 20a; step 394, generating photolighographic replicas of the circuit to be embodied; and step 396, reducing the photolighographic replicas to large scale integrated FET logic circuits.

Basic Concepts of FET Dynamic Logic

Figure 11A:
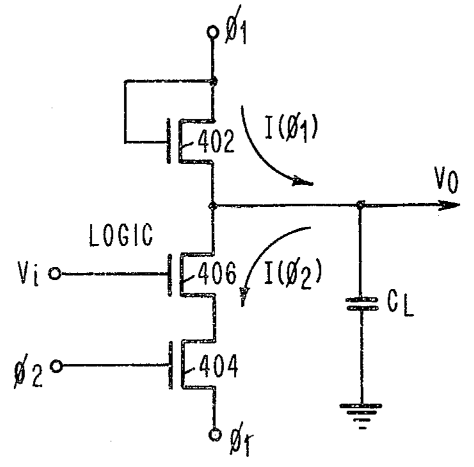
FIG. 11a PRIOR ART
FIG. 11*a* illustrates the basic inverter configuration for dynamic FET logic.

A basic characteristic of dynamic logic is its reliance upon a capacitance charge storage as memory to provide evaluated logic signals. FET dynamic logic is based on the basic inverter configuration of FIG. 11*a*, containing an unconditional precharge load device 402, a conditional discharge load device 404, and a logic input device 406. This type of circuit configuration relies upon charge storage at the output capacitive node of the associated load and logic devices. The capacitive charge is undated synchronously as a function of the clock waveform and the system timing. Additional logic inputs may be formed by substituting more complex arrangements of FET devices for logic input device 406. In this way a complicated logic structure can be formed with a single load device, one conditional logic device, and one device for each logical input.

Figure 11B:
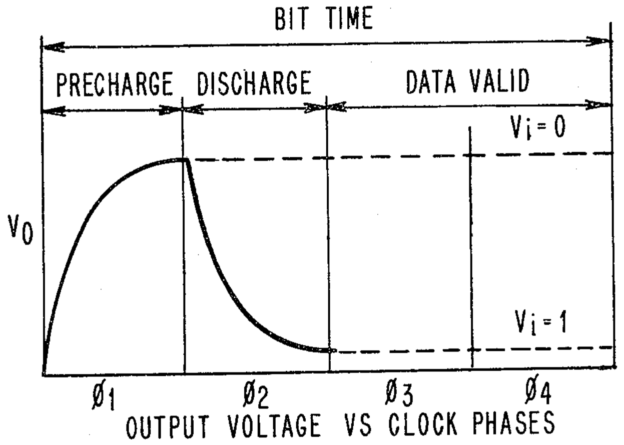
FIG. 11*b* is a graph showing the relationship between output voltage and clock phases for the inverter of FIG. 11*a*.

The operation of the basic four phase logic is described in FIG. 11*b*. The charging of the output capacitance to a standard level is independent of the ultimate valid logic level and is known as the precharge step. The evaluation phase which follows the precharge step, to establish what the valid logic level should be, is known as the conditional discharge step. An output that has completed its transistion to its proper level as determined by the logic inputs, comprises what is known as the valid logic period. The output level is not valid for logic purposes during the precharge or conditional discharge phases. The output capacitance $C_1$ is unconditionally charged to a high level during $0_1$, the precharge time. At the next clock phase $0_2$, the capacitance charge state is evaluated and either allowed to remain at a high level or is discharged to a low level, depending on the state of the logic input $V_i$. The $0_2$, or logic phase device 404 is required to prevent $V_i$ from prematurely discharging during $0_1$ precharge phase. Since the output is always at a high level during the $0_1$ and may be changing to a low level at $0_2$, the output is not logically valid during these phases. During phase $0_3$ and $0_4$, the output is valid and during this period succeeding logic circuits may be interfaced output-to-input. The output capacitance $C_1$ which serves to store the charge during $0_1$ comprises the output net wiring capacitance and the input capacitance of the driven devices.

Figure 12A:
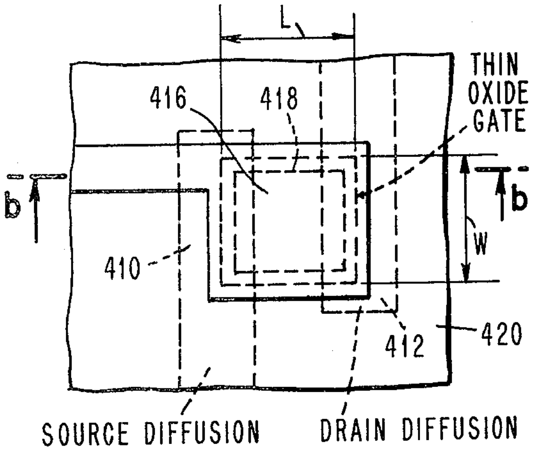
FIG. 12*a* is a detailed view of a typical FET device which can be laid out by the standardized two dimensional LSI-FET layout method.
Figure 12C:
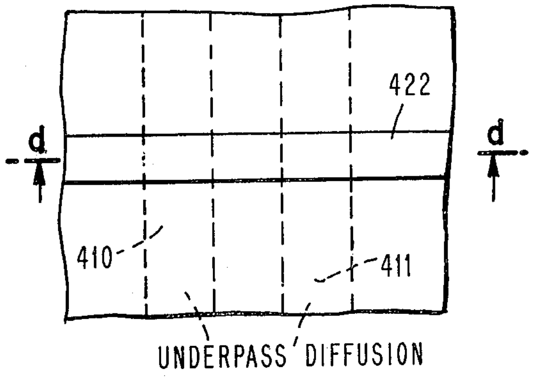
FIG. 12*c* is a detailed view of the metallized line with diffusion underpasses which can be laid out by the standardized two dimensional LSI-FET layout method.
Figure 12B:
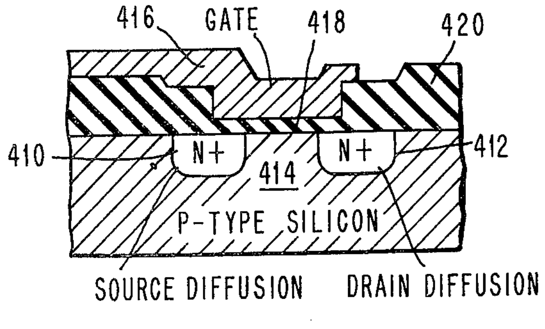
FIG. 12*b* is a cross sectional view along b–b′ of the FET device shown in FIG. 12*a*.
Figure 12D:
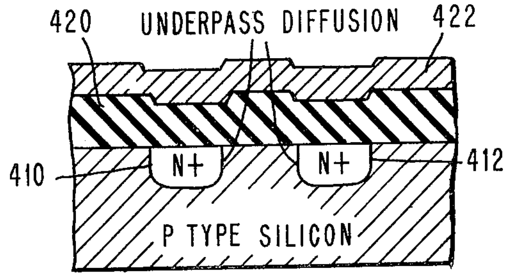
FIG. 12*d* is a cross sectional view along d–d′ of the diffusion underpasses shown in FIG. 12*c*.

A detailed view of a typical FET device which can be laid out by the standardized two dimensional LSI-FET layout method is shown in FIG. 12*a* and FIG. 12*b*. This device is formed by two N plus diffusions 410 and 412 separated by the channel region 414 of length L. A metallized gate electrode 416 is formed over a thin region 418 of the insulating layer 420, and has a width W. The source 410 and the drain 412 diffusions have a capacitance to the chip substrate which arises from the back biased diffusion junction. This capacitance will be associated with all diffusion areas within the chip and its value will be the function of the diffusion voltage. The capacitance between the gate electrode and the drain and source diffusion is composed of the overlap of the diffusion areas by thin oxide and the gate-to-channel capacitance. FIG. 12*b* shows a cross sectional view along line *b—b'* of the FET device shown in FIG. 12*a*. FIG. 12*c* shows a detailed view of a metallized line with diffusion underpasses which can be laid out by the standardized two dimensional LSI-FET layout method. The metallized line 422 lies upon the surface of the insulator 420 and may be a clock line, a logic gate line, or an output line. The diffusion 410, which serves as a source or drain diffusion for an FET device located in another part of the chip, as shown in FIG. 12*a*, may also pass under metallized signal lines 422 without a significant level of cross-talk. This is because the insulating layer 420 separating the diffusion 410 from the metallized line 422, remains relatively thick in comparison to the thickness of the insulator 418 in the gate regions of the FET devices. FIG. 12d is a cross sectional view along *d—d'* of the diffusion underpasses shown in FIG. 12*c*.

Application of the Layout Method

The standardized two dimensional LSI-FET layout method will be applied to laying out a four high NAND logical function in three different environments. It is the objective to illustrate that this standardized layout technique affords a high degree of flexibility in the location of the devices and the general shape of the array of devices, which may be altered to conform to the constraints of device size and the area available for embodying the logical function. FIG. 13 is a logic diagram for a four high NAND, with logical inputs A, B, C and D being operated upon by an AND logical operation and then inverted yielding the Booleon expression $V_o = \overline{A \, . \, B \, . \, C \, . \, D}$.

FIG. 14 is an electrical schematic for the four high NAND of FIG. 13, implemented in dynamic FET logic as previously discussed. Unconditional precharge load device 450 is labeled P and serves as the resistive load for the circuit, isolating output node $V_o$ from the $0_1$ clock line. Logic input devices 452, 454, 456 and 458 implement the logic input variables A, B, C and D respectively. Conditional discharge load device 460 is labeled CD and closes the discharge path to the $0_1$ clock line by means of its gate connection to $0_2$ line. Iterative circuit analysis techniques establish the width-to-length ratio (WLR) of each device based on external load, wiring capacitance, operating frequency and general layout configuration. For the instant example the WLR for devices 450 and 460 is two and the WLF for devices 452, 454, 456 and 458 is one.

FIG. 15 is a schematic layout of the diffusion segments necessary to implement the electrical network of FIG. 14. The lines 447, 449, 451, 453, 457 and 459 are each a schematic representation of diffusion segments necessary to form sources and drains for six FET devices and the diffusion interconnections therebetween. Blocks 462, 464, 466 and 468 are schematic representations of via perforations through the oxide layer connecting the diffusion segments to metallized lines lying on top of the insulating layer. The juxaposition of diffusion segments 447 and 449 forms the FET precharge device 470. The jusaposition of diffusion 449 and 451 defines the FET logic input device 472 for the logic input variable A. Similarly, the juxaposition of diffusions 451 and 453 defines FET 474, 453 and 455 define FET 476; 455 and 457 define FET 478; and 457 and 459 define FET 480. The phantom line 453 indicates the connection of the gate lead for the FET precharge device 470 to the via hole 464.

EXAMPLE A

In example A a simple configuration for prior structures in the vicinity of the layout operation will obtain. Example A will serve to illustrate how the four NAND may be embodied in the standardized two dimensional LSI-FET layout without the necessity of considering obstructions formed by previously defined devices and interconnections. The resulting alternating series layout will serve as a norm with which to compare the alternate layouts of Examples B and C. Such a comparison will give the observer some idea of the degree of flexibility available with the standardized two dimensional LSI-FET layout method.

Figure 16:
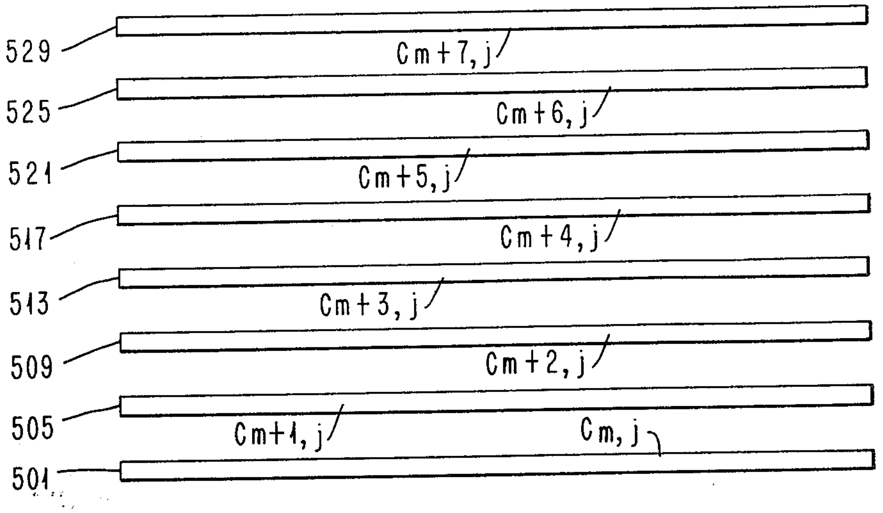
FIG. 16 illustrates the results of executing step 100 of the method of FIG. 3 which defines an array of virtual diffusion cells in the working medium.
Figure 17A:
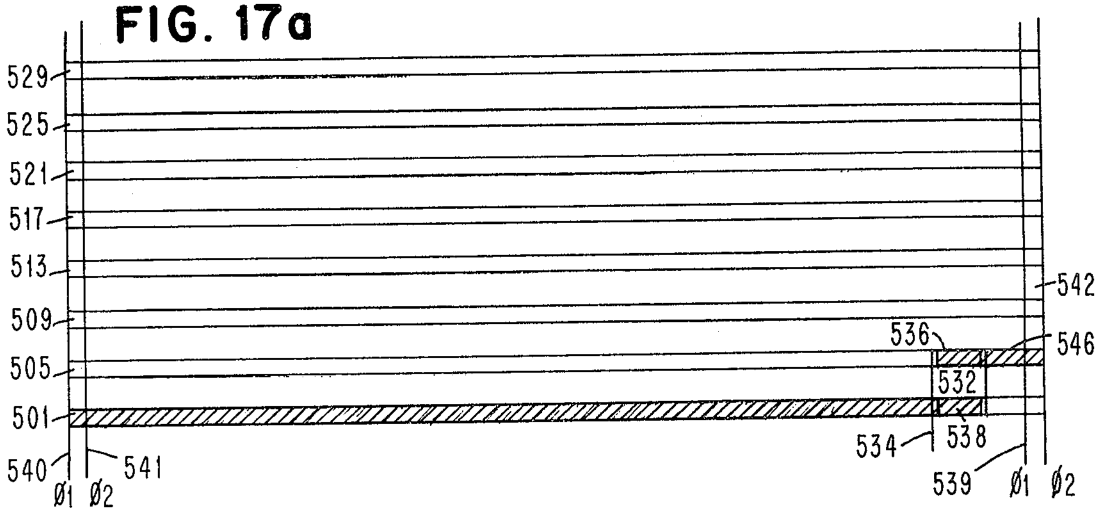
FIG. 17*a* illustrates the results of executing program steps 112 and 114 of the computer program implementation of FIG. 5, depicting prior structure in the working medium for example, A.

FIG. 16 illustrates the result of executing step 100 of the standardized two dimensional LSI-FET layout method of FIG. 3, defining a spaced parallel array of elongated virtual diffusion cells in a working medium. FIG. 16 shows eight diffusion cells, 501, 505, 509, 513, 517, 521, 525, and 529 labeled $C_{m,j}$ to $C_{m+7,j}$, having been generated by step 100 of FIG. 3. FIG. 17*a* illustrates the results of executing program steps 112 and 114 of the computer program implementation of FIG. 5, generating prior structures in the working medium for example A. As was previously mentioned the prior defined structures in Example A have been chosen so as not to obstruct the layout of the four high NAND. Thus, a single device comprising the gate image 532, gate lead image 534 the upper device diffusion image 536, and the lower device diffusion image 538 are read in from a single device word and is displayed on the working medium. Interconnection diffusions 544 and 546 are read in from two consecutive interconnection words and displayed in the working medium. Four wiring words are read corresponding to the $0_1$ metallizations 539 and 540 and the $0_2$ metallizations 541 and 542 and are displayed in the working medium. This simple, single device configuration represents the prior structures in the vicinity of the region in which the four high NAND is to be laid out.

FIG. 18*a* shows the result of executing steps 120 of the standardized two dimensional LSI-FET layout method, selecting the device positon coordinate cells. Device position coordinate 548 is positioned on the lower bounding reference line 520 of virtual diffusion cell 521.

FIG. 18*a* also illustrates the result of executing the step 140 of the standardized two dimensional LSI-FET layout method, calculating the device image in the working medium with respect to the device position coordinate. The gate image 550 is calculated and its image coordinates referenced with respect to the device position coordinates referenced with respect to the device position coordinate 548. The upper diffusion image 553 is calculated and its image coordinates are referenced with respect to the device positon coordinate 548. Now all the components of the device image 550 have been calculated referenced with respect to the device position coordinate 548, and displayed in the working medium.

FIG. 18*a* also illustrates the results of executing step 150 of the standardized two dimensional LSI-FET layout method, checking for conformity with device spacing requirements for example A. Since there are no devices whose device position coordinates reside in the virtual diffusion cell immediately above, immediately below or on the virtual diffusion cell $C_{m+5,j}$ upon which is located device position cordinate 548 of device 550, no new location for the device position coordinate need be selected.

FIG. 18*a* further shows the results of executing step 170 of the standardized two dimensional LSI-FET layout method, checking for device wirability for example A. The device lead image 552 has been defined to extend down only one channel length plus one diffusion length to the virtual diffusion cell 517 immediately below the virtual diffusion cell upon which the device position coordinate 548 of device 550 is located. In view of the fact that there are no other preexisting devices located in the vicinity of gate lead 552, the wirability check is completed.

Figure 19B:
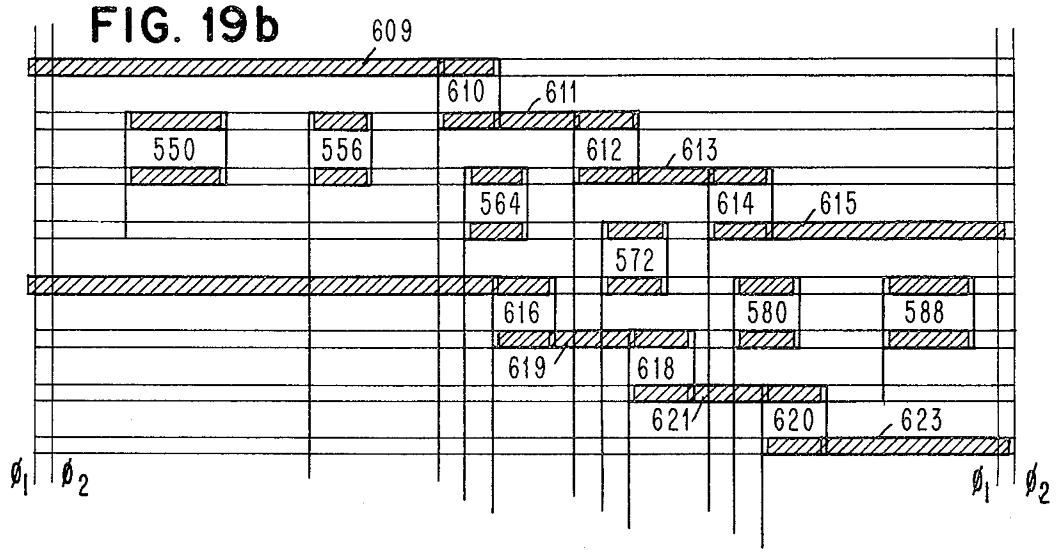
FIG. 19*b* illustrates the result of executing step 190 of the method of FIG. 3, repeating the method for all other devices in the circuit of example *b*.

FIG. 19*b* illustrates the results of executing step 190 of the standardized two dimensional LSI-FET layout method of repeating the steps of selecting, calculating, checking interdevice spacing, and checking device wirability for devices 556, 564, 572, 580 and 588 which comprise the balance of the four high NAND circuit to be embodied. It is seen that by virtue of the simple configuration for the preexisting structures in the vicinity of the area in which the NAND is laid out, a straight forward, linear arrangement for the FET devices is obtained, all of said devices residing on just two virtual diffusion cells, 521 and 525.

FIG. 20*a* illustrates the results of executing step 210 of the standardized two dimensional LSI-FET layout method, generating interconnection diffusion images connecting the source and drain images on the working medium to complete the circuit. Interconnection diffusion images connecting the source and drain images on the working medium to complete the circuit. Interconnection diffusion image 557 connects the lower device diffusion image 554 of device 550 to the via hole 549 which in turn makes connection with the $0_1$ wiring image 540. Interconnection diffusion image 559 connects upper diffusion image 553 of device 550 with the upper diffusion image of device 556. Similarly interconnection diffusion image 561 interconnects the lower diffusion images for devices 556 and 564. Interconnection diffusion images 567, 577, 583, 593, 596 and 551 complete the image of the diffusion interconnections necessary to form the four high NAND logical function in dynamic FET logic, in the working medium.

Minimum Height Alternating Series Array

It is to be noted at this point that the alternating series arrangement of devices 556, 564, 572 and 580 constitutes a minimum height configuration which is not to be found in the prior art. The alternating series array, as a topological circuit configuration, forms a basic element is many complex logical functions. The configuration is more profitably employed in situations where there is little room for circuit layout in the vertical direction. The topological arrangement of the alternating series array as depicted in FIG. 20*a* constitutes one facet of the invention herein disclosed.

EXAMPLE B.

Example B differs from Example A in the configuration of the prior structures which occupy positions in the vicinity of the region in which the layout is to be executed. These structures are obsticle around which the circuit to be embodied must be arranged.

FIG. 16 illustrates the results of executing step 100 of the standardized two dimensional LSI-FET layout method, defining a spaced parallel array of elongated virtual diffusion cells in a working medium.

Figure 17B:
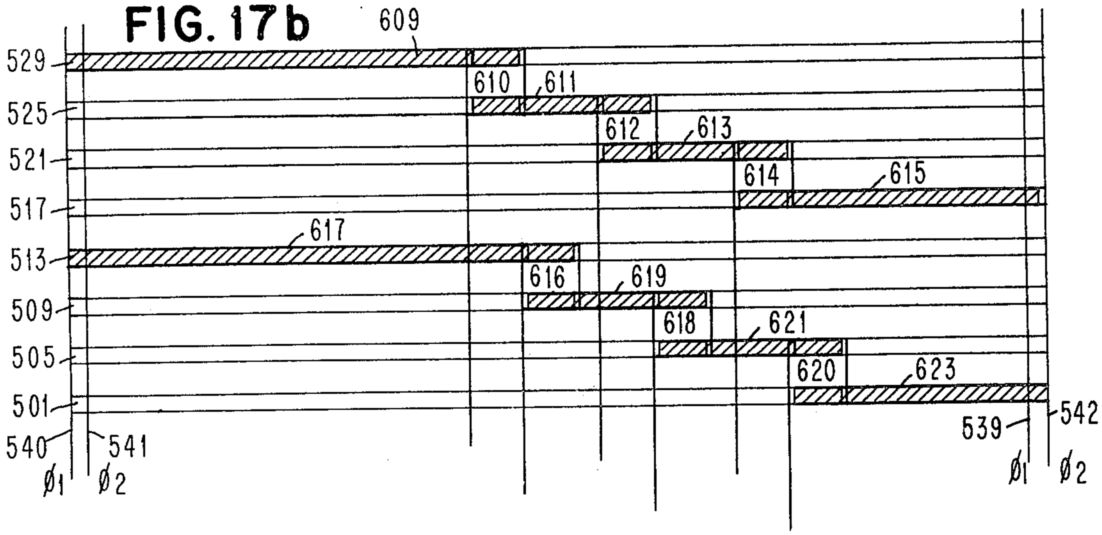
FIG. 17*b* illustrates the result executing program steps 112 and 114 of the computer program implementation of FIG. 5, depicting prior structures in the working medium, for example B.
Figure 18B:
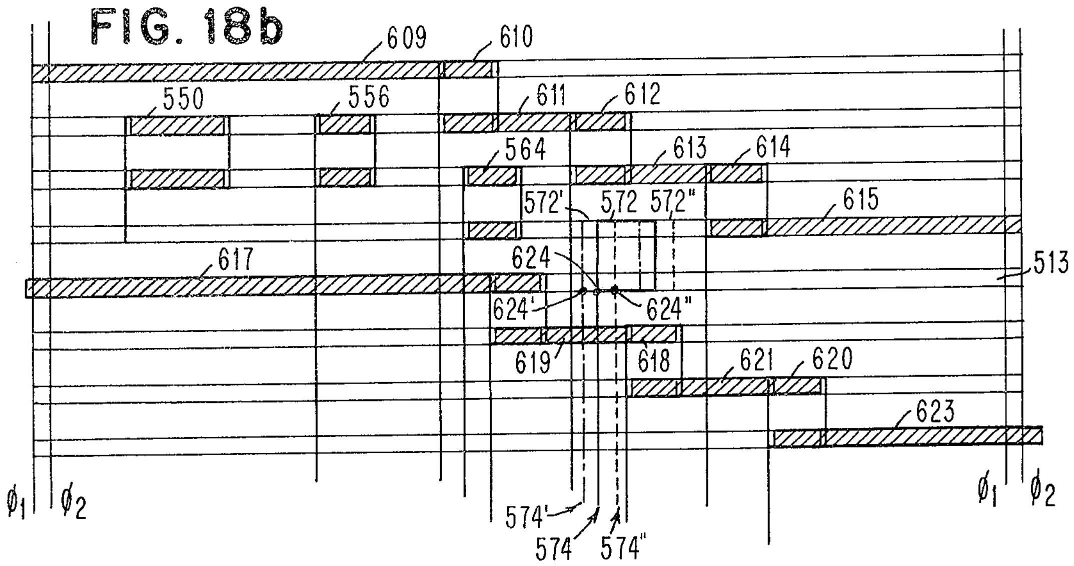
FIG. 18*b* illustrates the result of executing step 120 of the method of FIG. 3, selecting the device position coordinate with respect to the virtual diffusion cell, step 140 of the method of FIG. 3, calculating the gate and gate lead images and calculating the source and drain diffusion images, step 150 of the method of FIG. 3, checking for conformity with device spacing requirements, the step 170 of the method of FIG. 3, checking for device wirability, for device 572 of example B.

FIG. 17*b* illustrates the result of executing program steps 112 and 114 of the computer program implementation of Example B. Device words are read in for devices 610, 612 and 614. The device images are interconnected by interconnection diffusion images 609, 611, 613 and 615 read in by means of four interconnection words. Three more device words are read in generating device images 616, 618, and 620 which are interconnected by interconnection diffusion images 617, 619, 621 and 623. Four wiring words are read in for clockline metallizations 540, 541, 542 and 539. The series array of devices 610, 612 and 614 and the series array of devices 616, 618 and 620 permit only a narrow, step-wise path therebetween for the arrangement and interconnection of the device images for the four high NAND circuit to be layed out. FIG. 18*b* illustrates the standardized two dimensional LSI-FET layout method as it is applied to the positoning of device 572 after device 550, 556 and 564 have been layed out.

FIG. 18*b* illustrates step 120 of selecting the initial location for device position coordinate 624' in the working medium with respect to the virtual diffusion cell 513.

FIG. 18*b* further illustrates the step 140 of calculating the device image for device 572' in the working medium with respect to the device position coordinate 624'.

FIG. 18*b* further illustrates step 150 of checking the inter-device spacing between device 572' and the previously defined device 616. In the execution of step 150, it is determined that the interdevice spacing between device 572' and of prior existing device 616 is less than the predefined minimum spacing and thus, the method transfers to step 120 where the designer selects a new location for the device position coordinate 624'' as illustrated by the phantom device image 572''.

FIG. 18*b* further illustrates step 170 of checking for device wirability. Device wirability is checked by determining whether the gate lead 574'' for device 572'' is less than a predefined minimum distance from the prior existing device 618. In the execution of step 170, it is determined that the gate lead 574'' of 572'' is in fact less than said predefined minimum distance for prior existing device 618 and the method shifts back to step 120 where the designer selects a new location for the device position coordinate 624. The new location for device position coordinate 624 and correspondingly for the device image 572 satisfies steps 150 and 170 and therefore the method passes on to step 190.

FIG. 19*b* illustrates the result of executing step 190 repeating the method of selecting, calculating, checking interdevice spacing, and checking device wirability for the balance of the FET devices to be embodied in the four high NAND.

Figure 20B:
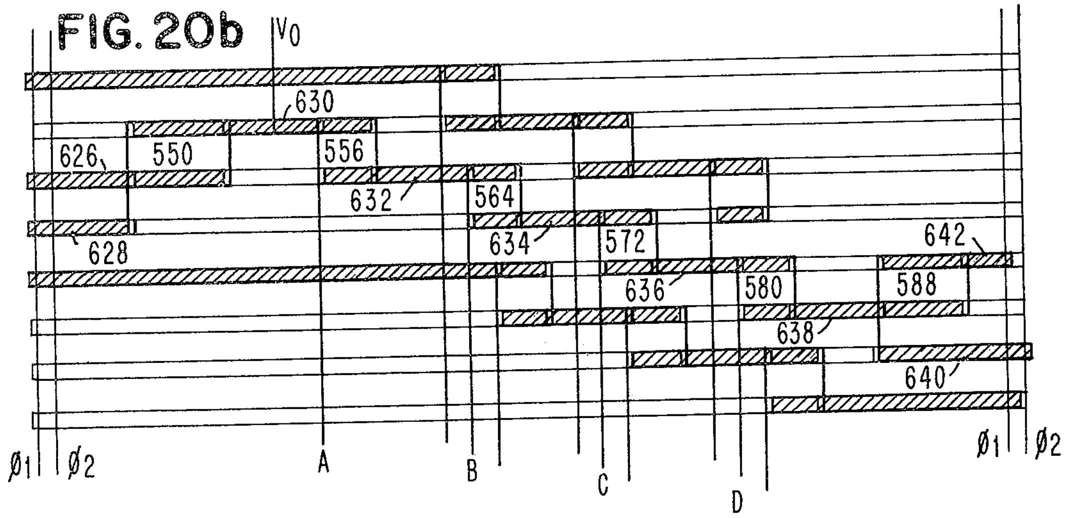
FIG. 20*b* illustrates the result of executing steps 210 of the method of FIG. 3, interconnecting the source and drain diffusion images to complete the circuit of example B.

FIG. 20*b* illustrates the result executing step 210, generating interconnection diffusion images within virtual diffusion cells, connecting the source and drain images in the working medium to complete the circuit. It is seen that the resulting layout configuraton for the four high NAND is step-wise linear, occupying five virtual diffusion cells 525, 521, 517, 513, and 509.

EXAMPLE C.

Figure 17C:
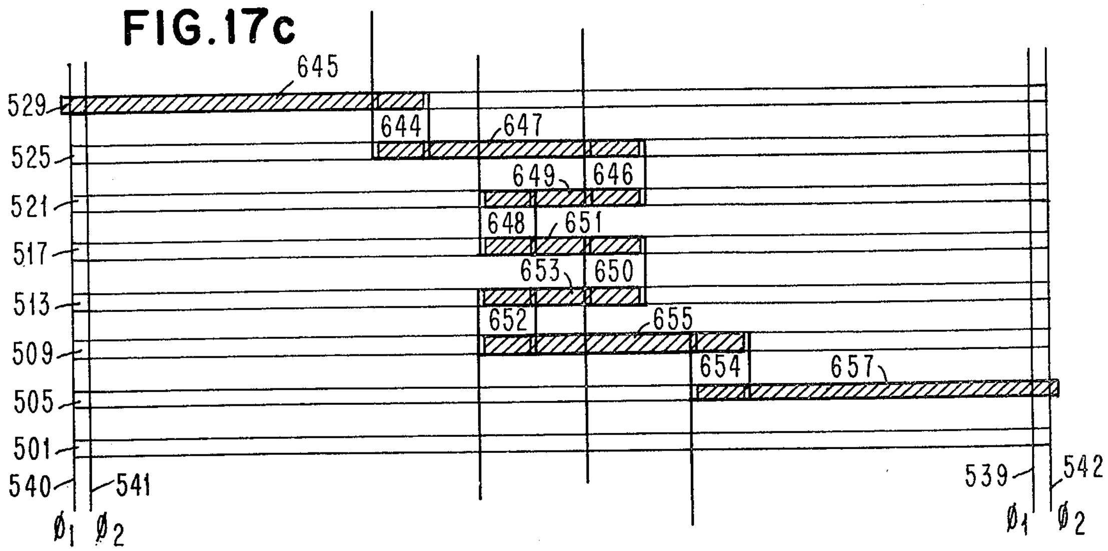
FIG. 17*c* illustrates the results of executing program steps 112 and 114 of the computer program implementation of FIG. 5, depicting prior structures in the working medium, for example C.

Example C differs from Examples A and B in that the prior defined structures completely obstruct any layout arrangement which would traverse the width of the column from the $0_1$ metallization 540 to the $0_2$ metallization 542, as shown in FIG. 17*c*.

FIG. 16 illustrates the execution of the step 100, of the method of FIG. 3, of defining a spaced parallel array of elongated virtual diffusion cells in a working medium.

FIG. 17*c* illustrates the execution of the program steps 112, and 114 of the computer program of FIG. 5, generating the prior structures in the working medium, for example C. It is seen that the devices 644, 646, 648, 650, 652 and 654 interconnected by interconnection diffusion images 645, 647, 649, 651, 653, 655 and 657, completely obstruct any layout which would extend across the width of the column.

Figure 18C:
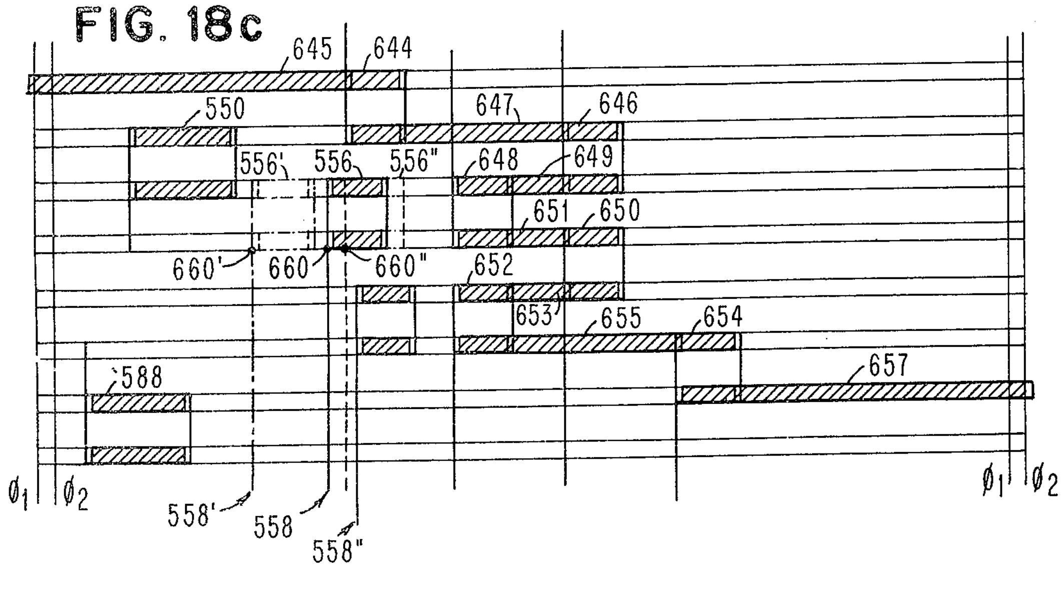
FIG. 18*c* illustrates the result of executing step 120 of the method of FIG. 3, selecting the device position coordinate with respect to the virtual diffusion cell, step 140 of the method of FIG. 3, calculating the gate and gate lead images and calculating the source and drain diffusion images, step 150 of the method of FIG. 3, checking for conformity with device spacing requirements, step 170 of the method of FIG. 3, checking for device wirability, for device 556 of example C.

FIG. 18*c* illustrates the operation of the standardized two dimensional LSI-FET layout method for laying out the four high NAND in the space available in the left hand side of the prior defined array of devices. The operation is shown in the stage of the layout after device images 550, 572 and 588 have been positioned.

FIG. 18*c* illustrates the result of executing step 120, selecting the device position coordinate 660' in the working medium with respect to the virtual diffusion cell 517.

FIG. 18*c* further illustrates the execution of step 140 calculating the device image for device 556' in the working medium with respect to the device position coordinate 660'.

FIG. 18*c* further illustrates the step of checking the interdevice spacing between the position of phantom devices 556' and the device 550. Execution of the step 150 indicates that the interdevice spacing between device 556' and device 550 is less than the predefined minimum and therefore the method shifts to step 120 where the designer selects a new location for the device position coordinate 660'' in the working medium with respect to the virtual diffusion cells.

FIG. 18*c* further illustrates a result of execution of step 170, checking the device wirability for device 556''. Execution of the step indicates that the gate lead 558'' of 556'' is less than the predefined minimum distance from device 572. The method therefore shifts from step 170 to step 120, where the designer selects a new location for the device position coordinate 660 in the working medium with respect to the virtual diffusion cells. A new device image 556 is calculated in step 140 with respect to the new location for the device position coordinate 660. The checking operation of step 150 and the checking operation of the step 170 are now satisfied and the method shifts to step 190.

Figure 19C:
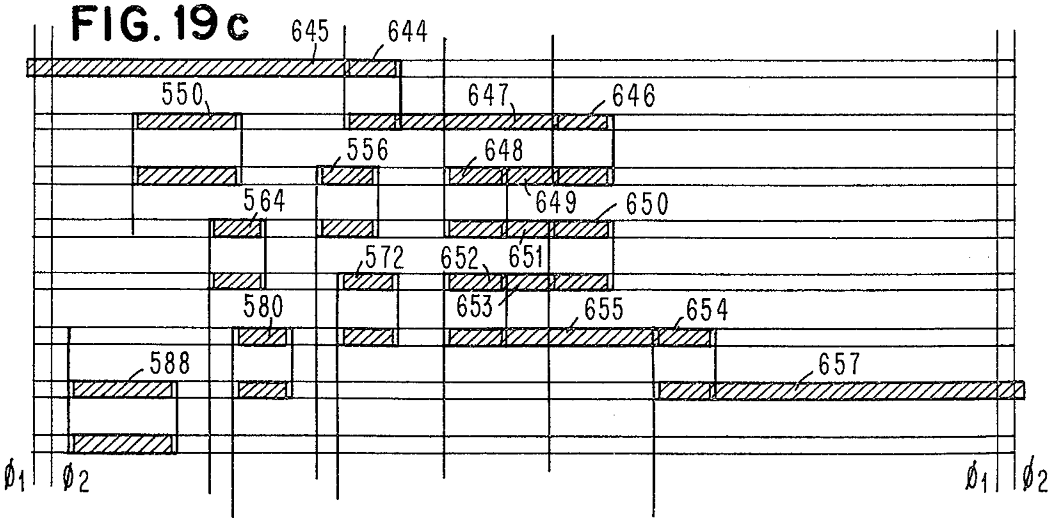
FIG. 19*c* illustrates the result of executing step 190 of the method of FIG. 3, repeating the method for all other devices in the circuit of example C.

FIG. 19c illustrates the execution of step 190, repeating the steps of selecting, calculating, checking interdevice spacing and checking device wirability for the balance of the device images to be embodied in the four high NAND.

Figure 20C:
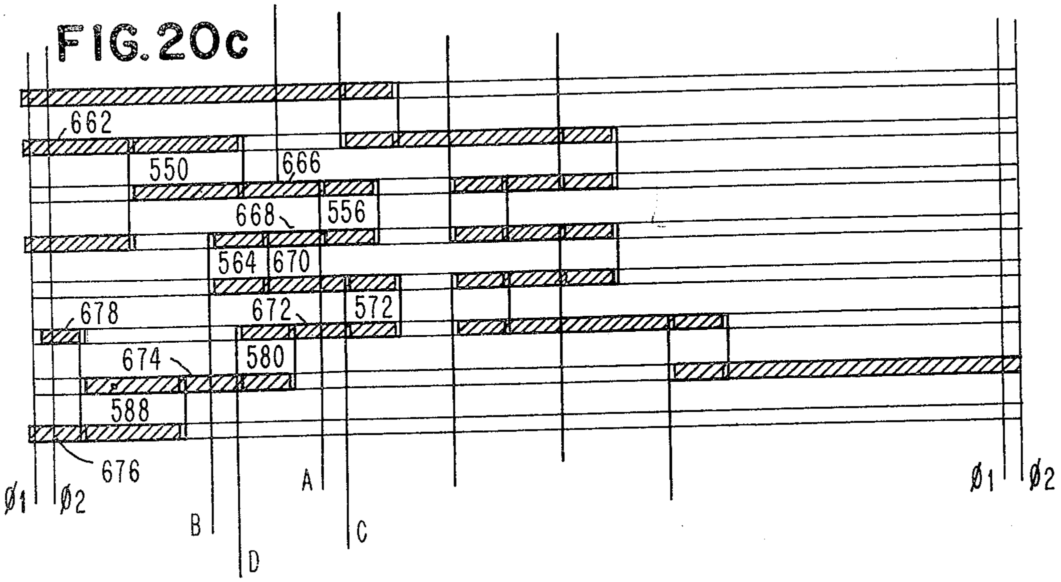
FIG. 20*c* illustrates the result of executing step 210 of the method of FIG. 3, interconnecting the source and drain diffusion images to complete the circuit of example C.

FIG. 20c illustrates the result of executing step 210, generating interconnection diffusion images within virtual diffusion cells, connecting source and drain images on the working medium to complete the four high NAND circuit. It is to be noted that both the precharge device 550 and the conditional discharge device 558 are connected to the same $0_1$ metallization 540 on the left hand side of the obstructing, prior defined structures.

Variable Aspect Ratio

Figure 21:
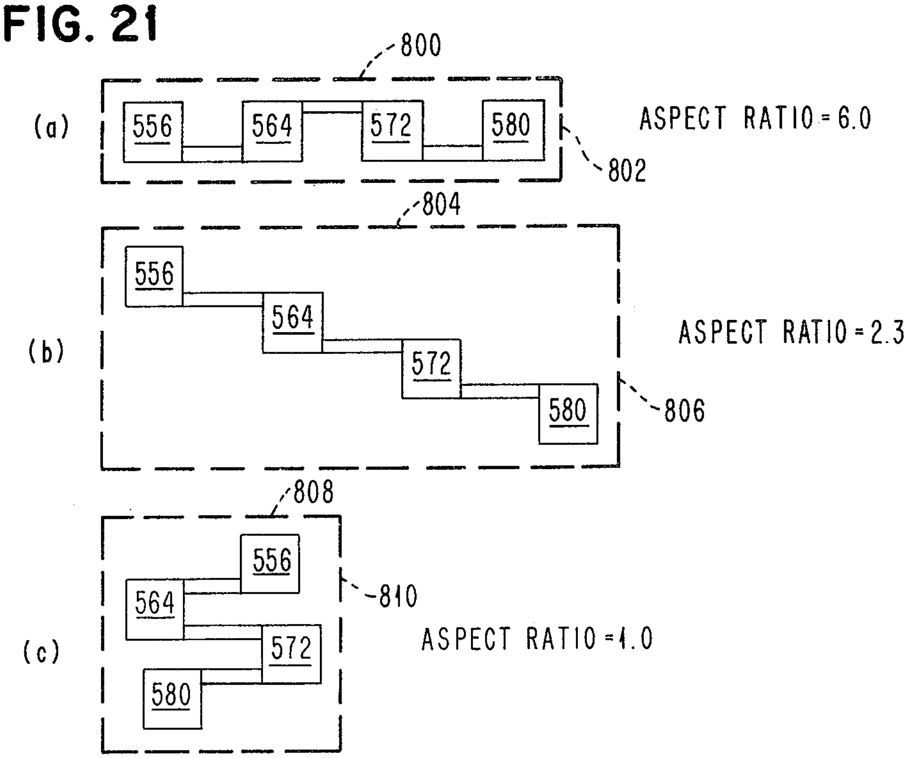
FIG. 21 illustrates the variable aspect ratio of the AND logical function as respectively laid out in FIGS. 20*a*, 20*b* and 20*c*.

The wirability in the topologies for the four high NAND as illustrated in Examples A, B and C may be qualified by means of a unit of measure called the aspect ratio. The aspect ratio of an integrated circuit layout is the ratio of the respective horizontal and vertical sides of a rectangle which will completely enclose the area within which a logic function is layed out. The aspect ratio is the ratio of the width of the encompassing rectangle in the X direction by the height of the rectangle in the Y direction. It can be seen from a casual inspection of the layouts in FIGS. 20a, 20*b* and 20c that the aspect ratio for the configuration employing an alternating series as in FIG. 20a is larger than the topological arrangement for the NAND as shown in FIG. 20c. The aspect ratio of the three topological arrangements for the four high NAND illustrated in FIGS. 20a, 20*b* and 20c are directly compared in FIG. 21. FIG. 21a illustrates the alternating series array for the four high NAND of FIG. 20a. The encompassing rectangle having horizontal side 800 and vertical side 802 yields an aspect ratio having a numerical value of 6.0. The stepwise linear topological configuration for the four high NAND constructed in FIG. 20b is illustrated in FIG. 21b where the encompasing rectangle having horizontal side 804 and vertical side 806 yields an aspect ratio having a numerical value of 2.3. Finally, the sinuous topological configuration for the four high NAND illustrated in FIG. 20c is shown in FIG. 21c where the encompassing rectangle having horizontal side 808 and vertical side 810 yields an aspect ratio having a numerical value of 1.0. The ability of the standardized two dimensional LSI-FET layout method to yield topological configurations for a given logical circuit, having aspect ratios whose relative values vary by a factor of six, illustrates the high degree of flexibility and freedom afforded by the method. Varying the aspect ratio of the layout for a given logical function to conform with the constraints of device size and the space available for embodiment of the function, is another aspect of the invention.

COMPLEX LOGICAL FUNCTION

A brief illustration of the application of the standardized two dimensional LSI-FET layout method to the layout of complex logical function is given. FIG. 22a illustrates the logic diagram for the complex logical function $V_O = \overline{BC(A+D) + G(E+H)(F+I)}$.

Figure 22D:
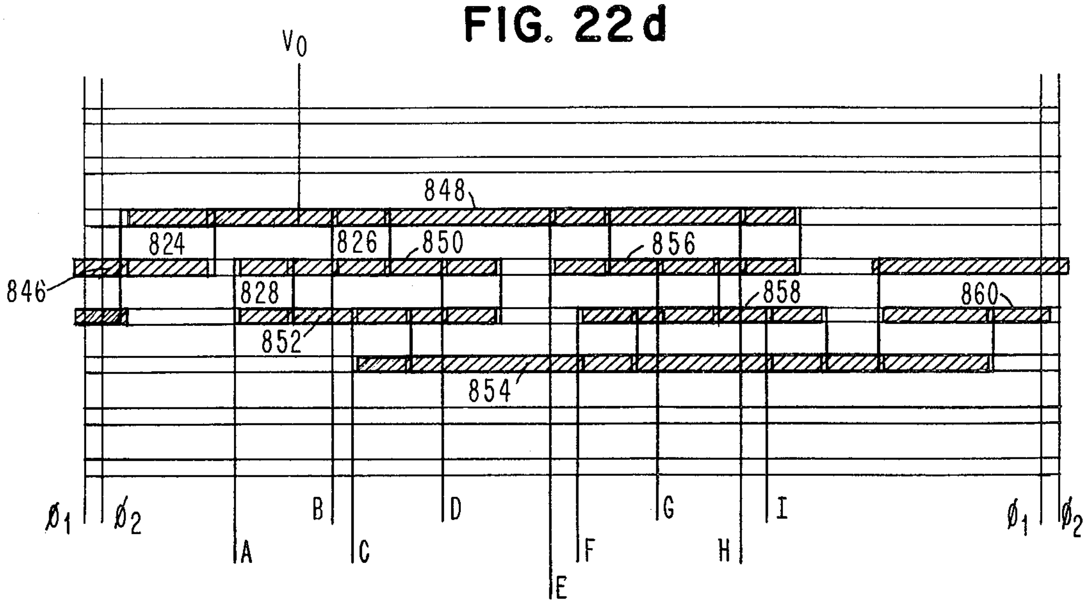
FIG. 22*d* illustrates the image of the layout for the complex logical function schematically diagrammed in FIG. 22*c*, as generated by the standardized two dimensional LSI-FET layout method.
Figure 22A:
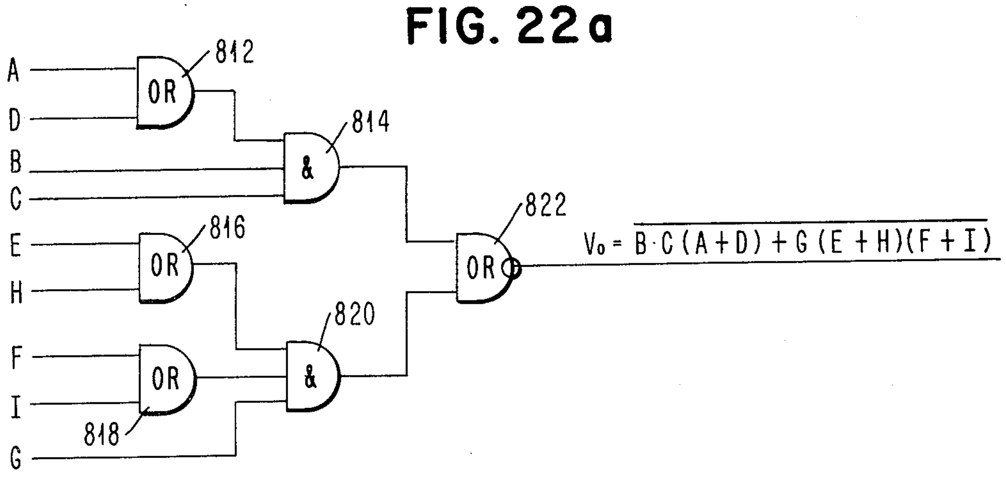
FIG. 22*a* illustrates a logic diagram for an example of a complex logical function.
Figure 22B:
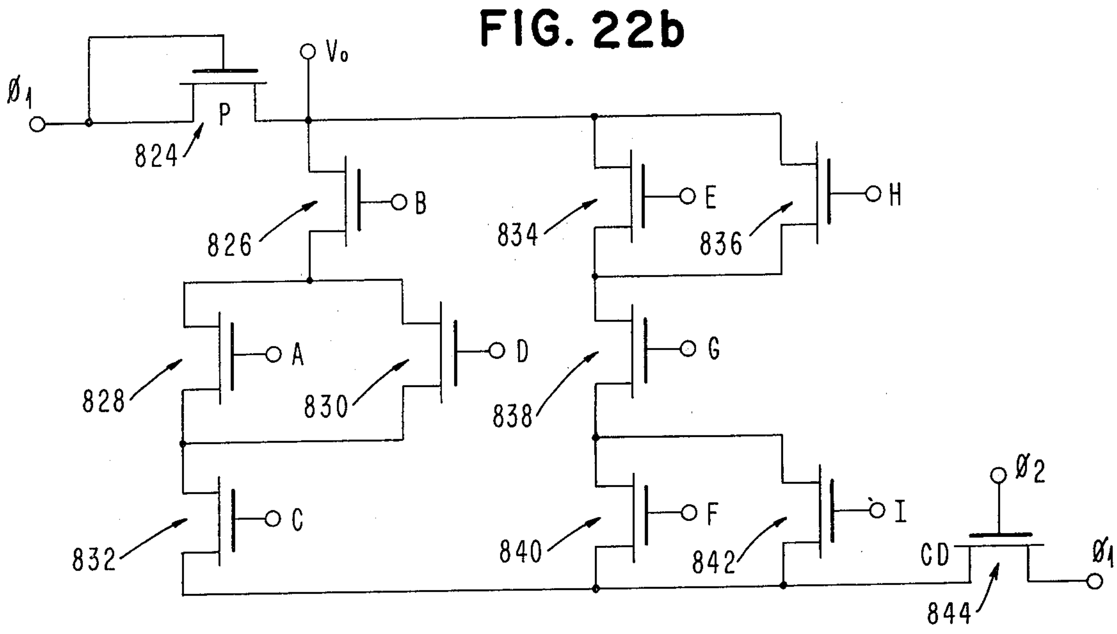
FIG. 22*b* illustrates an electrical schematic diagram for the complex logical function of FIG. 22*a*, implemented in the dynamic FET logic.

FIG. 22b illustrates the electrical schematic diagram implementing the complex logical function of FIG. 22a.

Figure 22C:
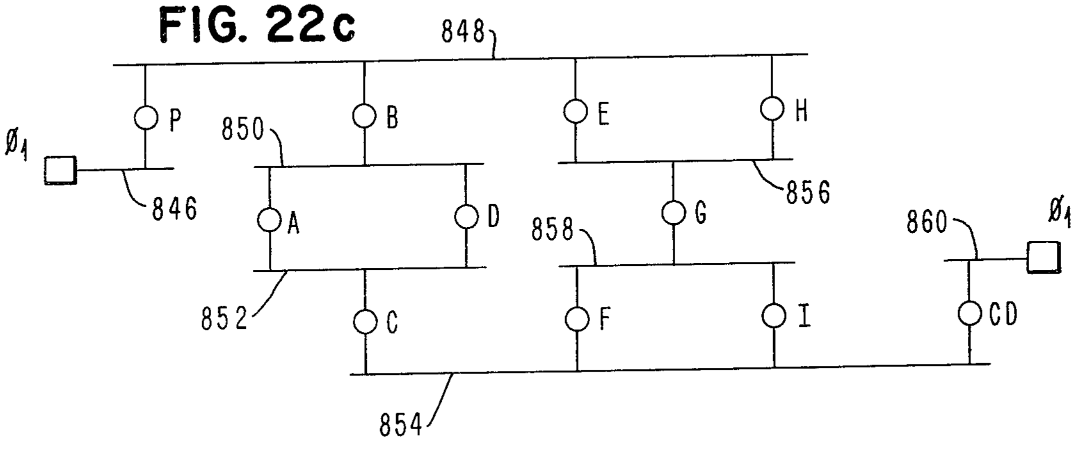
FIG. 22*c* illustrates a schematic layout diagram of diffusion segments necessary to implement the electrical network of FIG. 22*b*.

FIG. 22c illustrates a schematic diffusion layout of the diffusion segments necessary to layout the electrical network illustrated in FIG. 22b.

FIG. 22d illustrates a completed layout of the complex logical function schematically diagrammed in FIG. 22c, arranged by means of the standardized two dimensional LSI-FET layout method. The complex logical function is systematically layed out in an area smaller than that necessary to layout a comparable complex logical function by prior art methods. The standardized two dimensional LSI-FET layout method generates large scale integrated FET logical circuits having a higher logic function density and thus a higher logic power per unit are than was capable by standardized methods in the prior art.

Figure 23:
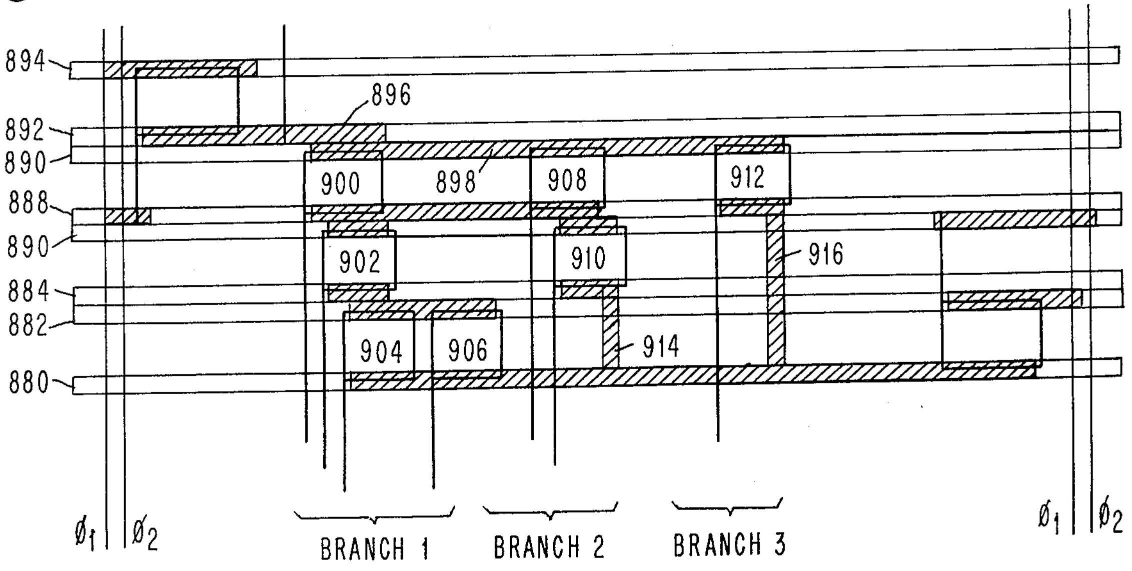
FIG. 23 illustrates a virtual diffusion cell array incorporating double rail diffusions to accommodate vertical gate coincidence and virtual stub diffusions to accommodate unequal branch lengths in a complex logic function layout.

DOUBLE RAIL DIFFUSIONS AND VERTICAL STUB DIFFUSIONS:

FIG. 23 illustrates that it is within the scope of the invention to form other arrangements for a spaced parallel array of virtual diffusion cells, than that shown in FIG. 16. In FIG. 23, a double rail array of virtual diffusion cells is illustrated. The double rail array has the practical advantage of allowing vertical gate coincidence between vertically adjacent gates such as gates 900, 902 and 904. A double rail virtual diffusion cell array permits a tighter packing of gates in the horizontal direction than is available with a single rail array of virtual diffusion cells such as is illustrated in FIG. 16.

Furthermore, it should not be construed that the standardized two dimensional LSI-FET layout method is limited to horizontal interconnecting diffusions. The vertical stub diffusions 914 and 916 illustrated in FIG. 23, serve to interconnect the devices in a complex logical function having parallel branches of unequal length. It is within the scope of the invention to include provision for vertical stud diffusions.

While the foregoing has described the invention as applied to dynamic FET logic, the standardized two dimensional LSI-FET layout and method are also applicable to static FET logic.

While the invention has been particularly shown and described with reference to the preferred embodiments thereof, it will be understood by those of skill in the art that the foregoing and other changes in form and detail may be made therein without departing from the spirit and scope of the invention.

What is claimed is:

1. In an insulated gate field effect transistor integrated circuit logic function layout having a plurality of spaced parallel rows of diffusions of a first conductivity type in a semiconductor wafer of a second conductivity type with portions of said semiconductor wafer between adjacent diffusions defining input channel regions sof field offset transistor devices, selected ones of said parallel diffusion being segmented into reduced lengths, wherein the improvement comprises:

a first and third diffusion segment in a first row, said first diffusion segment operating as a source diffusion in a first field effect transistor, said third diffusion segment operating as a drain diffusion in a second field effect transistor, a second diffusion segment in a second row adjacent to said first row, said second diffusion segment operating as a drain diffusion in said first field effect transistor and as a source diffusion in said second field effect transistor, each of said diffusion segments in said first row being partially juxtaposed with each of the nearest diffusion segments in said second row so as to define a sequence of channel regions bounded by an alternating sequence of diffusion segments, at least one gate electrode formed over the channel region defined by each juxtaposed pair of diffusion segments, said first and second diffusion segments forming said first field effect transistor whose drain diffusion is series connected by means of said second diffusion to the source diffusion of said second field effect transistor which is formed by said second and said third diffusion segments, whereby a logical function is formed in a two dimensional, alternating series array, providing a high logic power per unit area.

* * * * *

UNITED STATES PATENT OFFICE

CERTIFICATE OF CORRECTION

Patent No. 3,896,482 Dated July 22, 1975

Inventor(s) George E. Brechling and John J. Montren

It is certified that error appears in the above-identified patent and that said Letters Patent are hereby corrected as shown below:

Claim 1, line 60 - change "sof" to --of--; change "offset" to --effect--.

Claim 1, line 61 - change "diffusion" to --diffusions--.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*